(12) United States Patent
Salahieh et al.

(10) Patent No.: US 11,902,540 B2
(45) Date of Patent: Feb. 13, 2024

(54) IMMERSIVE VIDEO CODING USING OBJECT METADATA

(71) Applicant: INTEL CORPORATION, Santa Clara, CA (US)

(72) Inventors: Basel Salahieh, Santa Clara, CA (US); Fai Yeung, Palo Alto, CA (US); Jill Boyce, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 97 days.

(21) Appl. No.: 17/631,298

(22) PCT Filed: Sep. 30, 2020

(86) PCT No.: PCT/US2020/053635
§ 371 (c)(1),
(2) Date: Jan. 28, 2022

(87) PCT Pub. No.: WO2021/067503
PCT Pub. Date: Apr. 8, 2021

(65) Prior Publication Data
US 2023/0007277 A1    Jan. 5, 2023

Related U.S. Application Data

(60) Provisional application No. 62/908,983, filed on Oct. 1, 2019.

(51) Int. Cl.
*H04N 19/169* (2014.01)
*H04N 19/132* (2014.01)
(Continued)

(52) U.S. Cl.
CPC ......... *H04N 19/169* (2014.11); *H04N 19/132* (2014.11); *H04N 19/20* (2014.11); *H04N 19/597* (2014.11)

(58) Field of Classification Search
CPC .... H04N 19/169; H04N 19/132; H04N 19/20; H04N 19/597; H04N 2213/003;
(Continued)

(56) References Cited

U.S. PATENT DOCUMENTS

2015/0371432 A1   12/2015   Medioni et al.
2020/0098137 A1*   3/2020   Hemmer ................. G06T 9/001
(Continued)

FOREIGN PATENT DOCUMENTS

WO   WO-2011049519 A1 *   4/2011   ......... H04N 13/0048
WO   WO-2015027283 A1 *   3/2015   ............. G06T 15/20
(Continued)

OTHER PUBLICATIONS

Boyce et al. "Overview of SHVC: Scalable Extensions of the High Efficiency Video Coding Standard", IEEE Transactions on Circuits and Systems for Video Technology, vol. 26 No. 1, (Year: 2016).*
(Continued)

*Primary Examiner* — Fernando Alcon
(74) *Attorney, Agent, or Firm* — Hanley, Flight & Zimmerman, LLC

(57) ABSTRACT

Methods, apparatus, systems and articles of manufacture for video coding using object metadata are disclosed. An example apparatus includes an object separator to separate input views into layers associated with respective objects to generate object layers for geometry data and texture data of the input views, a pruner to project the first object layer of a first basic view of the at least one basic views against the first object layer of a first additional view of the at least one additional views to generate a first pruned view and a first pruning mask, a patch packer to tag a patch with an object identifier of the first object, the patch corresponding to the
(Continued)

first pruning mask, and an atlas generator to generate at least one atlas to include in encoded video data, the atlas including the patch.

20 Claims, 18 Drawing Sheets

(51) Int. Cl.
*H04N 19/20* (2014.01)
*H04N 19/597* (2014.01)

(58) Field of Classification Search
CPC ...... H04N 19/17; H04N 19/187; H04N 19/46; H04N 19/70; G06T 9/001; G06T 9/002
See application file for complete search history.

(56) References Cited

U.S. PATENT DOCUMENTS

| | | | |
|---|---|---|---|
| 2020/0154121 A1* | 5/2020 | Boyce | H04N 19/132 |
| 2022/0007000 A1* | 1/2022 | Lee | H04N 19/597 |
| 2022/0122217 A1* | 4/2022 | Lee | G06T 9/001 |
| 2023/0011027 A1* | 1/2023 | Lee | H04N 13/128 |
| 2023/0232031 A1* | 7/2023 | Lee | H04N 19/17 |
| | | | 375/240.08 |

FOREIGN PATENT DOCUMENTS

| | | | |
|---|---|---|---|
| WO | 2019079032 A1 | 4/2019 |
| WO | 2019110405 A1 | 6/2019 |
| WO | 2019115866 A1 | 6/2019 |
| WO | 2021067503 A1 | 4/2021 |

OTHER PUBLICATIONS

Jeong et al. "Towards 3DoF+ 360 Video Streaming System for Immersive Media", IEEE Access (Year: 2019).*

International Searching Authority, "Written Opinion," issued in connection with application No. PCT/US2020/053635, dated Jan. 20, 2021, 4 pages.

International Searching Authority, "International Search Report," issued in connection with application No. PCT/US2020/053635, dated Jan. 20, 2021, 3 pages.

Guan Pang et al., "Fast and Robust Multi-view 3D Object Recognition in Point Clouds", IEEE Conference Publication, IEEE Xplore, 2015 International Conference on 3D Vision, Oct. 19-22, 2015 (publicly available version retrieved from https://web.archive.org/web/20170808191154id_/http://graphics.usc.edu/cgit/publications/papers/3dv2015.pdf on Jan. 22, 2022, 9 pages).

Ebrahimi et al., "MPEG-4 Natural Video Coding—An Overview," Image Communication, Elsevier Science Publishers, vol. 15, No. 4-5, Jan. 2000, 21 pages.

Servais et al., "Progressive Polygon Encoding of Segmentation Maps," 2004 International Conference on Image Processing (ICIP), Oct. 2004, 4 pages.

Ng et al., "Object-Based Coding for Plenoptic Videos," IEEE Transactions on Circuits and Systems for Video Technology, vol. 20, No. 4, Apr. 2010, 15 pages.

Maugey et al., "Key View Selection In Distributed Multiview Coding," 2014 IEEE Visual Communications and Image Processing Conference, Dec. 7, 2014, 4 pages.

ISO/IEC, "Working Draft 2 of Immersive Video," MPEG, Motion Picture Expert Group, ISO/IEC JTC1/SC29/WG11, Aug. 2019, 38 pages.

ISO/IEC, "Test Model 2 for Immersive Video," International Organization for Standardization, Motion Picture Expert Group, Aug. 2, 2019, 29 pages.

Salahieh et al., "Object-Based Applications for Immersive Video Coding," Motion Picture Expert Group (MPEG), ISO/IEC, JTC1/SC29/WG11, No. m50949, Oct. 2019, 6 pages.

European Patent Office, "Extended European Search Report," issued in connection with European Patent Application No. 20872715.6, dated Sep. 25, 2023, 12 pages.

* cited by examiner

IMMERSIVE VIDEO CODING USING OBJECT METADATA

RELATED APPLICATION

This patent arises from the U.S. stage of International Patent Application No. PCT/US2020/053635, which is titled "IMMERSIVE VIDEO CODING USING OBJECT METADATA," and was filed on Sep. 30, 2020, which claims the benefit of U.S. Provisional Patent Application Ser. No. 62/908,983, which was filed on Oct. 1, 2019. International Patent Application No. PCT/US2020/053635 and U.S. Provisional Patent Application Ser. No. 62/908,983 are hereby incorporated herein by reference in its entirety their respective entireties. Priority to International Patent Application No. PCT/US2020/053635 and U.S. Provisional Patent Application Ser. No. 62/908,983 is hereby claimed.

FIELD OF THE DISCLOSURE

This disclosure relates generally to video coding, and, more particularly, to immersive video coding using object metadata.

BACKGROUND

Video codecs are electronic circuits or software that compress or decompress digital video. For example, video codecs may be used to convert uncompressed video to a compressed format, and/or vice versa.

Figure 1:
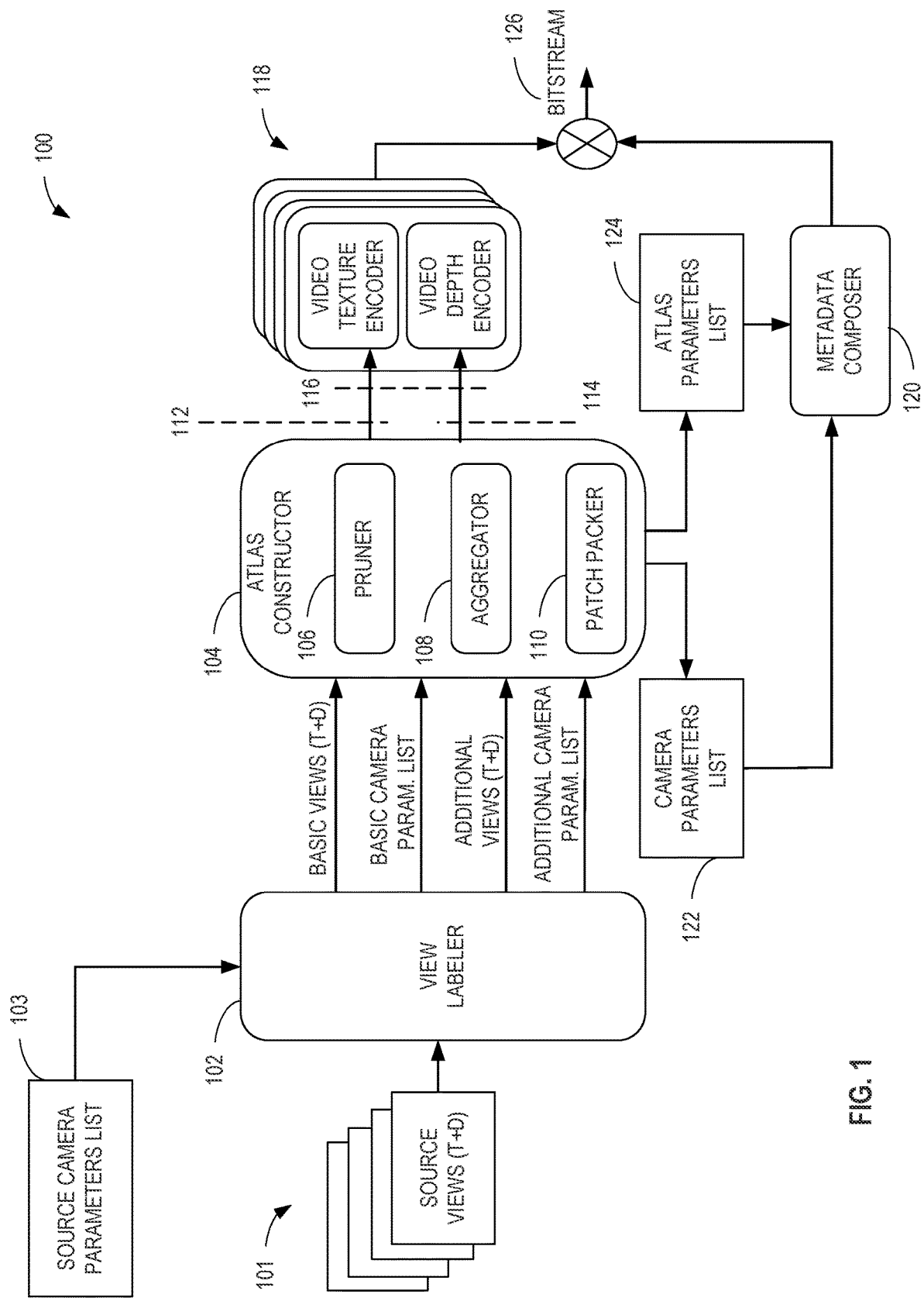
FIG. 1 illustrates a block diagram of an example Moving Picture Experts Group (MPEG) Immersive Video (MIV) encoder.

The figures are not to scale. In general, the same reference numbers will be used throughout the drawing(s) and accompanying written description to refer to the same or like parts. Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/− 1 second.

DETAILED DESCRIPTION

Advancements in digital media technology are enabling delivering of compelling immersive experiences with new media formats. The Moving Picture Experts Group (MPEG) is one standardization group that is developing standards to support immersive media access and delivery. For example, the coded representation of immersive media (MPEG-I) is a set of immersive media industry standards directed to immersive media formats, such as panoramic 360° video, volumetric point-clouds, and immersive video.

MPEG is developing an immersive video coding standard called MPEG immersive video (MIV). The MIV draft standard codes texture and depth video for multiple input views, each at a particular position and orientation, using the existing High Efficiency Video Coding (HEVC) video codec. The MIV decoder does not specify the reference renderer but supplies it with the required metadata and decoded streams. The intended output of the reference renderer is a perspective viewport of the texture, with the viewport selected based upon a viewer's position and orientation, and generated using the outputs of the immersive media decoder. The MIV standard enables the viewer to dynamically move with 6 Degrees of Freedom (6DoF), adjust position (x, y, z) and orientation (yaw, pitch, roll) within a limited range (e.g., as supported by a head mounted display, a two-dimensional (2D) monitor with positional inputs as examples, etc.).

However, the MIV draft standard does not include representation of objects in a video scene. As used herein, the terms "object" or "entity" are used interchangeably and refer to actors, things, properties, etc., in images. For example, an object can correspond to a physical object (e.g., a person, a piece of furniture, etc.) and/or a part of a physical object (e.g., a hand of a person, a head of a person, a t-shirt a person is wearing, etc.) represented in the scene. Additionally or alternatively, an object can correspond to a segmentation of the scene based on one or more aspects of the scene, such as reflectance properties, material definitions, etc. For example, an object can also be materials (e.g., skin of a person, hair of a person, grass, etc.), colors (e.g., green, blue, etc.), etc. represented in the scene. Presently, the MIV draft standard lacks the capability of distinguishing between different objects in a video scene, separating the background or floor from other objects in a video scene, etc., and using such information to customize the transmitted stream and synthesized scene based on network conditions and visual experiences desired by the end user.

Methods, apparatus, and systems for object-based immersive video coding are disclosed herein. For example, objects within the object-based immersive videos, as disclosed herein, can be indexed, filtered, and coded in better fidelity while being able to control bandwidth utilization and better support objects of interest. The techniques described herein thus enable object-based operations including identifying and separation of objects and/or separation of objects from the background, thereby enabling network adaptive, attention-based, and personal scene synthesis in immersive video coding standards. Example techniques disclosed herein can also improve quality and performance while enabling new immersive use cases.

Example encoding techniques disclosed herein include receiving input views and assigning the input views as a basic view or an additional view, with the input views including texture maps, depth maps, and/or object maps. Disclosed example techniques also include generating object layers based on the object maps, the respective object layers each to include pixels associated with one corresponding object, with each object being associated with one or multiple corresponding object layers. Disclosed example techniques further include pruning input views by projecting object layers of basic views onto object layers of additional views and/or object layers of previously pruned views to generate pruning masks. Disclosed example techniques also include aggregating the pruning masks to form patches, where each patch includes data of a corresponding single object. Disclosed examples further include packing the patches into atlases and generating an encoded bitstream including the atlases and metadata. In some examples, the metadata includes a camera parameters list, an atlas parameters list, etc.

Example decoding techniques disclosed herein include decoding an encoded bitstream into atlases (e.g., texture data, depth data) and metadata. Disclosed example techniques further include generating an occupancy map indicating the position of the patch in the atlas. Disclosed example techniques also include object filtering of the atlas data (e.g., to identify objects, to remove objects, etc.).

Disclosed example techniques further include synthesizing a view/port based on the filtered atlas data, the metadata, and the desired viewing position and orientation.

FIG. 1 illustrates a block diagram of an example MEG Immersive Video (MIV) encoder 100. The example MIV encoder 100 includes an example view labeler 102, an example atlas constructor 104, an example encoder 118, and an example metadata composer 120. The example MIV encoder 100 receives example input views 101. For example, the input views 101 include texture data (e.g., texture bitstreams) and depth data (e.g., depth bitstreams) of the captured scene. As used herein, "texture" and "attribute" are used interchangeably and refer to visible aspects of a pixel, such as the color component (e.g., red-green-blue (RGB) components) of the pixel. As used herein, "depth" and "geometry" are used interchangeably unless noted otherwise as the geometry of a pixel typically includes the pixel's depth, which refers to the distance of the pixel from a reference plane. For example, the input views 101 can be source views generated by video capturers, virtual views generated by a computer, etc. In the illustrated example, the input views 101 are represented as a video sequence. The example MIV encoder 100 further receives an example source camera parameter list 103. For example, the source camera parameter list 103 can include where source cameras are positioned, the angle of source cameras, etc.

The example view labeler 102 selects views to encode. For example, the view labeler 102 analyzes the input views 101 and selects which views to encode. In some examples, the view labeler 102 labels views of the input views 101 as a basic view or an additional view. As used herein, a basic view is an input view that is to be packed in an atlas as a single patch. As used herein, an additional view is an input view that is to be pruned and packed in one or more patches. For example, the view labeler 102 can determine how many basic views there can be in the input views based on criteria such as pixel rate constraints, a sample count per input view, etc.

The example atlas constructor 104 receives basic and/or additional views determined by the example view labeler 102. The example atlas constructor 104 includes an example pruner 106, an example aggregator 108, and an example patch packer 110. The example pruner 106 prunes the additional views. For example, the pruner 106 projects the depth and/or texture data of the basic views onto the respective depth and/or texture data of the additional views and/or the previously pruned views to extract non-redundant occluded regions.

The example aggregator 108 aggregates the pruning results generated by the example pruner 106 to generate patches. For example, the aggregator 108 accumulates the pruning results (e.g., pruning masks) over an intra-period (e.g., a predetermined collection of frames) to account for motion. In the illustrated example, the patches include an example texture component 112 and an example depth component 114. The example patch packer 110 packs the patches into one or more example atlases 116. For example, the patch packer 110 performs clustering (e.g., combining pixels in a pruning mask to form patches) to extract and pack rectangular patches into atlases. In some examples, the patch packer 110 updates the content per frame across the processed intra-period.

The patch packer 110 tags the patch with a patch identifier (e.g., a patch ID). The patch ID identifies the patch index. For example, the patch IDs can range from 0 to one less than the number of patches generated. The patch packer 110 can generate a block to patch map (e.g., a patch ID map). The block to patch map is a 2D array (e.g., representative of point positions/locations in an atlas) indicating the patch ID associated with a given block of one or more pixels. Additionally or alternatively, the patch packer 110 generates an occupancy map to indicate whether a pixel of the patch is occupied (e.g., valid) or unoccupied (e.g., invalid). That is, the occupancy map is a binary map. In some examples, the occupancy map has a value of 1 to indicate a pixel is occupied and a value of 0 to indicate a pixel is not occupied.

The example video encoder 118 generates encoded atlases. That is, the video encoder 118 encodes the example texture component 112 and the example depth component 114. For example, the video encoder 118 receives the example atlases 116 and encodes the texture component 112 and the depth component 114 using an HEVC video encoder. However, the example video encoder 118 can additionally or alternatively use an Advanced Video Coding (AVC) video encoder, etc. In some examples, the video encoder 118 includes a video texture encoder and a video depth encoder.

The example metadata composer 120 generates a metadata bitstream. For example, the metadata composer 120 receives an example camera parameters list 122 and an example atlas parameters list 124. The example camera parameters list 122 includes how views (e.g., the basic views and/or the additional views) are placed and oriented in space. The example atlas parameters list 124 includes how patches are mapped between the atlases 116 and the views. For example, the atlas parameters list 124 can include the occupancy map and/or the block to patch map. The example MIV encoder 100 generates an encoded bitstream 126. For example, the WV encoder 100 multiplexes the encoded atlases and the metadata bitstream together.

Figure 2:
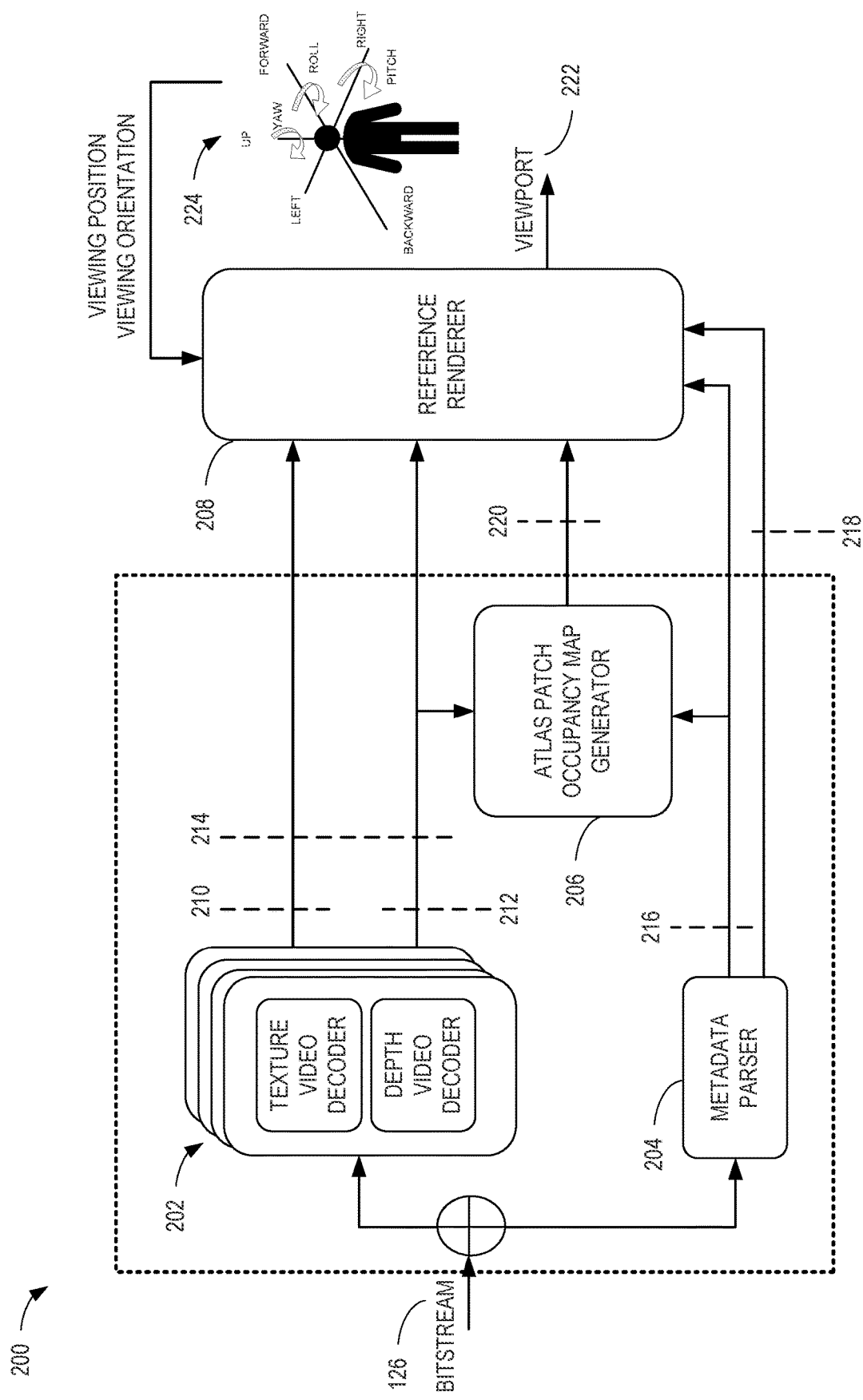
FIG. 2 illustrates a block diagram of an example MPEG Immersive Video (MIV) decoder.

FIG. 2 illustrates a block diagram of an example MIV decoder 200. The example MIV decoder 200 includes an example video decoder 202, an example metadata parser 204, an example atlas patch occupancy map generator 206, and an example reference renderer 208.

The example MIV decoder 200 receives the encoded bitstream 126 (FIG. 1). The example video decoder 202 generates a sequence of decoded picture pairs of example decoded texture pictures 210 and example decoded depth pictures 212. In the illustrated example, the example decoded texture pictures 210 and the example decoded depth pictures 212 represent an example atlas 214. For example, the video decoder 202 can be an HEVC decoder. In some examples, the decoder 202 includes a video texture decoder and a video depth decoder.

The example metadata parser 204 parses the encoded bitstream 126 to generate an example atlas parameters list 216 and an example camera parameters list 218. For example, the metadata parser 204 parses the encoded bitstream 126 for the example atlas parameters list 124 (FIG. 1) to generate the atlas parameters list 216. Additionally or alternatively, the example metadata parser 204 parses the encoded bitstream 126 for the example camera parameters list 122 (FIG. 1) to generate the camera parameters list 218.

The example atlas patch occupancy map generator 206 generates an example atlas patch occupancy map 220. In the illustrated example, the atlas patch occupancy map 220 is the same size as the atlas 214 and indicates whether the pixel of the atlas 214 is occupied. For example, the atlas patch occupancy map generator 206 accesses the example decoded depth pictures 212 and the example atlas parameters list 216 to generate a decoded occupancy map (e.g., the atlas patch occupancy map 220).

[0041] The example reference renderer 208 generates an example viewport 222. For example, the reference renderer 208 accesses one or more of the decoded atlases 214, the atlas parameters list 216, the camera parameters list 218, the atlas patch occupancy map 220, and the viewer position and orientation 224. That is, the example reference renderer 208 outputs a perspective viewport of the texture images, selected based on the example viewer position and orientation 224.

Figure 3:
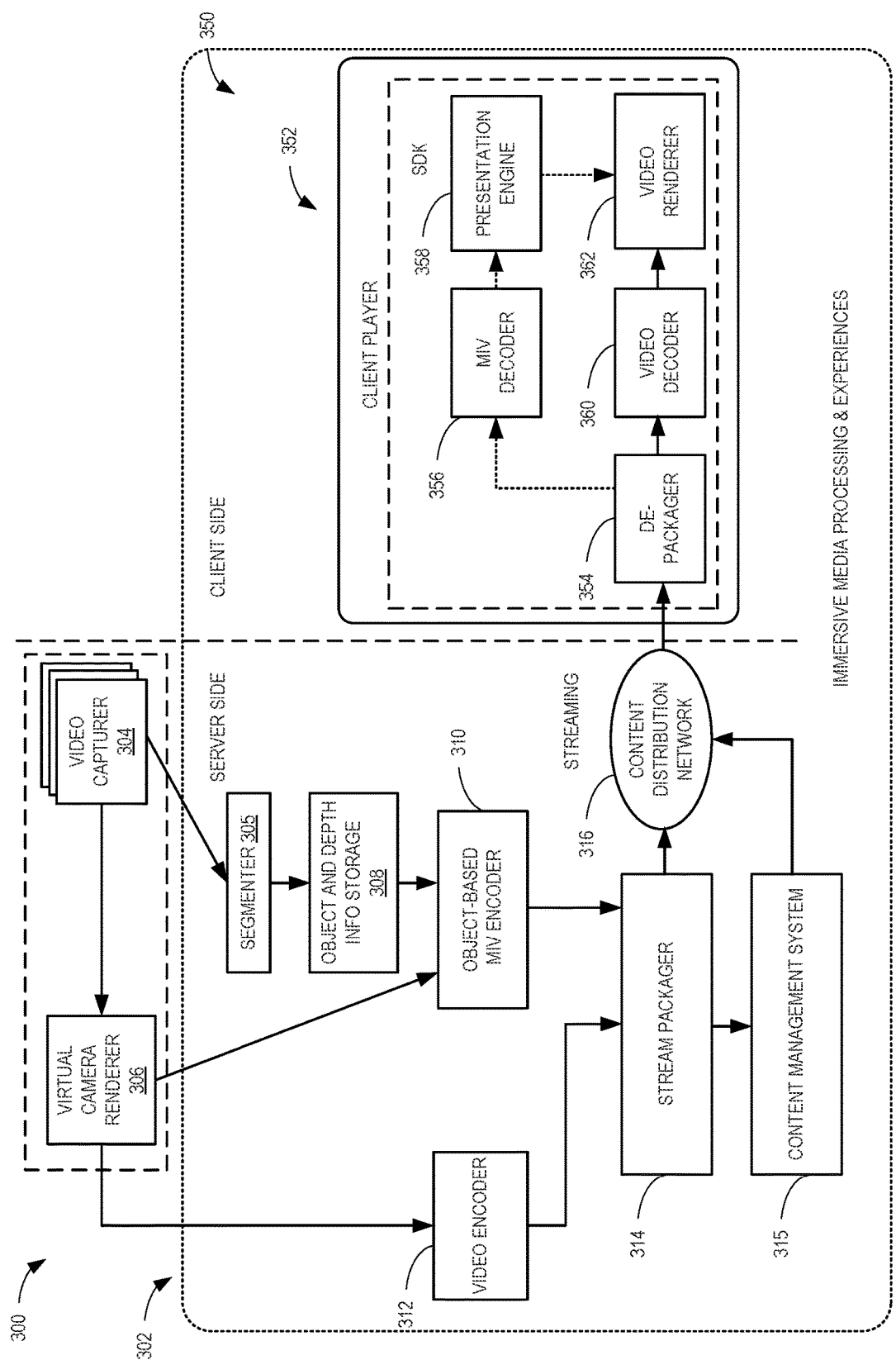
FIG. 3 illustrates a block diagram of an example object-based MIV coding system implemented in accordance with teachings of this disclosure.

FIG. 3 illustrates a block diagram of an example object-based MIV coding system 300 implemented in accordance with teachings of this disclosure. The example object-based MIV coding system 300 includes an example server side immersive video encoding system 302 and an example client side immersive video decoding system 350. The example server side immersive encoding system 302 includes one or more example video capturers 304, an example segmenter 305, an example virtual camera renderer 306, example object and depth information storage 308, an example object-based MIV encoder 310, an example video encoder 312, an example stream packager 314, an example content management system 315, and an example content distribution network 316.

The example video capturer(s) 304 capture image data. For example, the video capturer(s) 304 can include and/or interface with an image sensor (e.g., a camera) to capture frames of images. In some examples, the video capturer(s) 304 implement an array of image sensors to capture frames of images at different angles. The example virtual camera renderer 306 obtains data from the example video capturer(s) 304 (e.g., frames of images). For example, the virtual camera renderer 306 determines depth information and/or object segmentation information of the data captured. The server side immersive video encoding system 302 receives the virtual camera data.

The example object and depth information storage 308 stores object and depth data. For example, the object and depth information storage 308 stores object maps generated by the example segmenter 305. In some examples, the segmenter 305 generates object identifiers (e.g. object IDs) for each pixel of immersive data (e.g., the texture data and the depth data). For example, the segmenter 305 uses a machine-learning classifier, a conventional classifier with or without pattern recognition, and/or a segmentation algorithm to analyze pixels of the immersive data (e.g., texture and depth data) to (i) identify one or more different objects represented in the views and (ii) assign object ID(s) to pixels of the views such that the pixels representing the same object in different views are assigned a same object ID. That is, pixels of different views belonging to the same object will have the same object ID. The segmenter 305 generates one or more object maps to store the object IDs for each pixel of immersive data. Additionally or alternatively, the example video capturer(s) 304 can capture and assign an object ID to individual objects in a similar manner and then populate the objects in the same scene. In some examples, the object IDs are provided by a computer-generated graphics program. That is, object IDs can be assigned to objects during graphics generation. For example, a video game can generate a video labeled with object identifiers (e.g., the video game provides object identifiers for each object in a video sequence).

In examples disclosed herein, the immersive data generated by the virtual camera renderer 306 includes texture data, geometry data, and object IDs. In some examples, the immersive data includes texture maps, geometry maps, and object maps. For example, the (X, Y, Z) values of a pixel represent the geometry (e.g., location) of the pixel in the depth map with respect to a reference 3D global coordinate system (e.g., having 3 orthogonal dimensions labeled the X, Y and Z dimensions). The (R, G, B) values of the pixel represent texture components (e.g., three color components, such as red, green and blue color components) of the pixel in the texture map. The object ID value of the pixel identifies the object represented by the corresponding pixel in the texture and depth maps.

In examples disclosed herein, an object ID identifies an object so that there are no duplicated object IDs for different immersive data objects in a scene within a finite time period. In some examples, the number of bits used to represent the object ID depends on the number of objects supported in the object-based MIV coding system 300. For example, the number of bits to encode object identifiers can have a fixed length or a variable length depending on the total number of objects in a scene. For example, the object maps can be the same resolution as the texture and depth maps, but the bitdepth of the object map (e.g., the number of bits used to represent each entry of the object map) depends on the number of objects in the scene. For example, the object ID can be represented by a byte, with the last bit reserved to indicate an extension. In some such examples, the extendibility of the object ID is to support usages with a large number (e.g., thousands) of possible objects. For example, if the images captured by the video capturer(s) 304 include six objects, the bitdepth of the object maps may include at least three bits to store the six object IDs. In another example, if the images captured at the video capturer(s) 304 include 20,000 objects, the bitdepth of the object maps may include at least 16 bits to store 20,000 object IDs. In some examples, the number of bits used to store object IDs in the object maps changes based on the number of objects in a scene, thereby reducing the number of unused bits. Additionally or alternatively, a normalized format of object IDs can use eight bits to store up to 256 objects, 16 bits to store 256-65536 objects, etc.

The example object-based MIV encoder 310 receives immersive video data (e.g., generated by the example virtual camera renderer 306) and/or the object and depth information storage 308. The object-based MIV encoder 310 performs object-based encoding of the immersive data. For example, the object-based MIV encoder 310 prunes the plurality of views and generates patches. In examples disclosed herein, the object-based MIV encoder 310 generates patches such that each patch is associated with a single object, and different patches can be associated with the same or different objects. The object-based MIV encoder 310 packs the generated patches in atlases. In some examples, the object-based MIV encoder 310 generates occupancy map bitstreams including an occupancy map. For example, the occupancy map indicates whether pixels of the atlases are occupied.

The example object-based MIV encoder 310 enables object-based network scalability. That is, the object-based MIV encoder 310 identifies and processes immersive objects and/or backgrounds of various views separately, enabling object-based scalability for adaptive streamlining over different network conditions. For example, patches belonging to objects not of interest can be entirely dropped (e.g., not included in the encoded bitstream) or encoded at a lower visual quality than objects of interest (e.g., relatively less bandwidth is allocated to objects not of interest).

The example object-based MIV encoder 310 enables an attention-based user experience. An attention-based user experience allows viewers to focus on objects of interest when certain actions occur in the scene. For example, the object-based MIV encoder 310 can use motion activity (e.g., the depth data over a plurality of frames) to determine the location of action. For example, an action in a sports game can be the motion of a ball. The object-based MIV encoder 310 allocates a relatively higher hit budget to the patches of the immersive objects belonging to the action collection. Thus, users can zoom into the higher resolution patches to see a high fidelity rendering of the object of interest.

The example object-based MIV encoder 310 enables object-based variable patch rate encoding. For example, patches of background and/or static objects (e.g., inferred from the object labels) can be signaled once per intra-period, while patches of moving objects can be signaled every frame. The example pruners included in the example object-based MIV encoder 310 determine whether to extract object patches once per intra-period, once per frame, etc., based on object labels within the bounding box Supplemental Enhanced Information (SEI) message of the object.

The example object-based MIV encoder 310 enables object tracking. For example, the object-based MIV encoder 310 can synthesize a viewport video to track the movement of a specific immersive object using bounding box information associated with the object (e.g., "follow object" navigation path).

The example video encoder 312 performs video encoding. For example, the video encoder 312 encodes frames captured from virtual cameras (e.g., 360° videos) in separate channels to support backward compatibility. For example, the video encoder 312 encodes data compatible with decoders that do not support MIV (e.g., the consumer device at the client side immersive video decoding system 350 does not support a MIV decoder). In some examples, the server side immersive video encoding system 302 does not include the video encoder 312.

The example stream packager 314 combines the encoded bitstreams together. That is, the example stream packager 314 produces a multiplexed bitstream. For example, the stream packager 314 combines the encoded bitstream of the object-based MIV encoder 310 and the encoded bitstream of the video encoder 312. In some examples, the stream packager 314 adds metadata indicating various assets in the scene. For example, the stream packager 314 adds the frame rate of the encoded bitstream, the resolution of the encoded bitstream, the amount of bandwidth available, etc.

The example content management system 315 controls imaging modalities streamed to the client side immersive video decoding system 350. For example, the server side immersive video encoding system 302 generates view from different modalities of imaging (e.g., point cloud images, 360° video, etc.) capturing the same scene. The content management system 315 determines whether to selects subsets of the modalities. For example, if a user is not viewing 360° content, the content management system 315 extracts viewport corresponding to the viewer position and orientation.

The example content distribution network 316 is a network used to transmit the multiplexed bitstream to the example client side immersive video decoding system 350. In some examples, the content distribution network 316 can be the Internet or any other suitable external network. Additionally or alternatively, any other suitable means of transmitting the multiplexed bitstream to the client side immersive video decoding system 350 can be used.

The example client side immersive video decoding system 350 includes an example client player 352. In the illustrated example of FIG. 3, the client player 352 includes an example de-packager 354, an example MIV decoder 356, an example presentation engine 358, an example video decoder 360, and an example video renderer 362.

The example de-packager 354 demultiplexes the multiplexed bitstream. That is, the example de-packager 354 receives the multiplexed bitstream from the example server side immersive video encoding system 302 via the example content distribution network 316 and demultiplexes the bitstream to generate substreams (e.g., the video bitstream, the MIV bitstream, etc.).

The example MIV decoder 356 decodes the MIV bitstream. For example, the MIV decoder 356 decompresses object map bitstreams and/or patch bitstreams to reconstruct geometry data. An example implementation of the MIV decoder 356 is described below in conjunction with FIG. 5.

The example presentation engine 358 maps the decoded atlases and metadata generated by the MIV decoder 356 to the projection format of the client player 352. For example, the presentation engine 358 reconstructs the input views. For example, the presentation engine 358 reconstructs the input views based on the projection format (e.g., rectangular projection, perspective projection, orthographic projection, etc.).

The example video decoder 360 decodes the video bitstream. For example, the video decoder 360 decompresses the texture and geometry bitstreams. In some examples, the video decoder 360 matches the video encoder 312 (e.g., uses the same video coding format). For example, the video decoder 360 can be an HEVC decoder.

The example video renderer 362 generates viewport (e.g., volumetric) content. For example, the video renderer 362 receives the reconstructed input views from the presentation engine 358 and the decoded video bitstream from the video decoder 360 and generates volumetric content. Additionally or alternatively, the video renderer 362 performs object filtering, occupancy reconstruction, pruned view reconstruction, and synthesizes a view. For example, the video renderer 362 identifies an object ID corresponding to a selected object to be removed from the viewport. The video renderer 362 removes the patches corresponding to the identified object ID. The volumetric content is displayed to a user of the client player 352. An example implementation of the video renderer 362 is described below in conjunction with FIG. 5.

In examples disclosed herein, the video renderer 362 performs priority rendering. For example, the video renderer 362 updates background objects and/or static objects (e.g., determined based on the object IDs) once per intra-period. As used herein, a static object is an object that has moved an imperceptible amount by a user (e.g., as determined by one or more criteria, such as one or more thresholds, percentages, etc.). For example, depending on the application, a static object may not have a displacement greater than one foot, one inch, etc., with respect to a previous frame. That is, the background objects and static objects are assumed to not change substantially over an intra-period. For example, the video renderer 362 can identify object IDs of objects of interest to synthesize and output those objects first (e.g., objects that should be rendered in real-time). The video renderer 362 obtains the patches corresponding to the identified object IDs and synthesizes those patches. Thus, the video renderer 362 synthesizes background objects and/or static objects at a relatively later time (e.g., once per intra-period). This saves computing resources and bandwidth, allowing for greater bandwidth allocation to objects of interest.

In some examples, the video renderer 362 performs object-based averaging. For example, the video renderer 362 blends pixels belonging to the same object based on object IDs in object maps. That is, the video renderer 362 identifies pixels corresponding to the same object ID. Thus, the sharpness of objects' edges and the fidelity of the rendered views is increased. In examples in which there are pixels belonging to more than one object on the same rendered pixels (e.g., overlapping objects), the video renderer 362 averages pixels of the dominant object (e.g., the object with the maximum number of samples across various views on the same pixel location) and excludes the pixels of the non-dominant objects.

In some examples, the video renderer 362 identifies objects of interest. For example, the video renderer 362 identifies a bounding box tagged with the object ID of the object of interest (e.g., the bounding box includes objects of interest) that was identified by the example object-based MIV encoder 310. In some examples, the video renderer 362 blurs the pixels outside of the bounding box (e.g., the background, objects outside the bounding box, etc.) and synthesizes a view of the bounding box. In some examples, the video renderer 362 renders the bounding box at a higher resolution (e.g., for a zooming application, etc.).

In some examples, the example video renderer 362 performs background rendering. For example, the video renderer 362 identifies the object ID corresponding to the background and renders patches associated with the object ID of the background separately from the objects of the scene. In some examples, the patches generated by the object-based MIV encoder 310 include regions in the background that are missing information (e.g., not visible) in any of the input views due to occlusions. The example video capturer(s) 304 (FIG. 3) can capture the scene without objects (e.g., before a sports game begins, etc.) and stream within the metadata a single image per intra-period to be used by the video renderer 362 to render the background. Additionally or alternatively, the video renderer 362 can filter out the captured background object (e.g., the patches tagged with the object ID of the background) and instead synthesize virtual content (e.g., render a background, render prerendered content, etc.). For example, the video renderer 362 can render a customized advertisement banner on a wall, replace a synthetic background with a custom design, change the color of different objects within the scene, etc.

In some examples, the example video renderer 362 utilizes object-based varying patch rates. The example video renderer 362 determines whether to obtain samples from the patches within the current frame or the intra-period based on the dominant object ID of the to-be-rendered pixel. For example, the video renderer 362 determines to obtain patches tagged with the object ID of the background from the intra-period instead of the current frame in order to save bandwidth.

In some examples, the example video renderer 362 performs object-based scaling. For example, the video renderer 362 synthesize patches tagged with the object ID of an object of interest at a higher resolution in response to the object-based MIV encoder 310 forming patches of the object of interest at a larger resolution.

The example video renderer 362 allows for a personalized 6DoF user experience. For example, viewers of object-based immersive video can request to filter out uninteresting and/or unimportant (e.g., user preference) objects and keep only relevant or interesting objects. In some examples, the object-based MIV encoder 310 signals objects of interest based on bounding box attributes (e.g., object labels, location, size, etc.) streamed in an SEI message (e.g., all data and/or objects have been streamed to the client side immersive video decoding system 350). The video renderer 362 removes patches tagged with object IDs that don't correspond to objects of interest (e.g., the video renderer 362 does not render the objects not of interest), allowing for a personalized experience for viewers to choose only content that matters to them.

Figure 4:
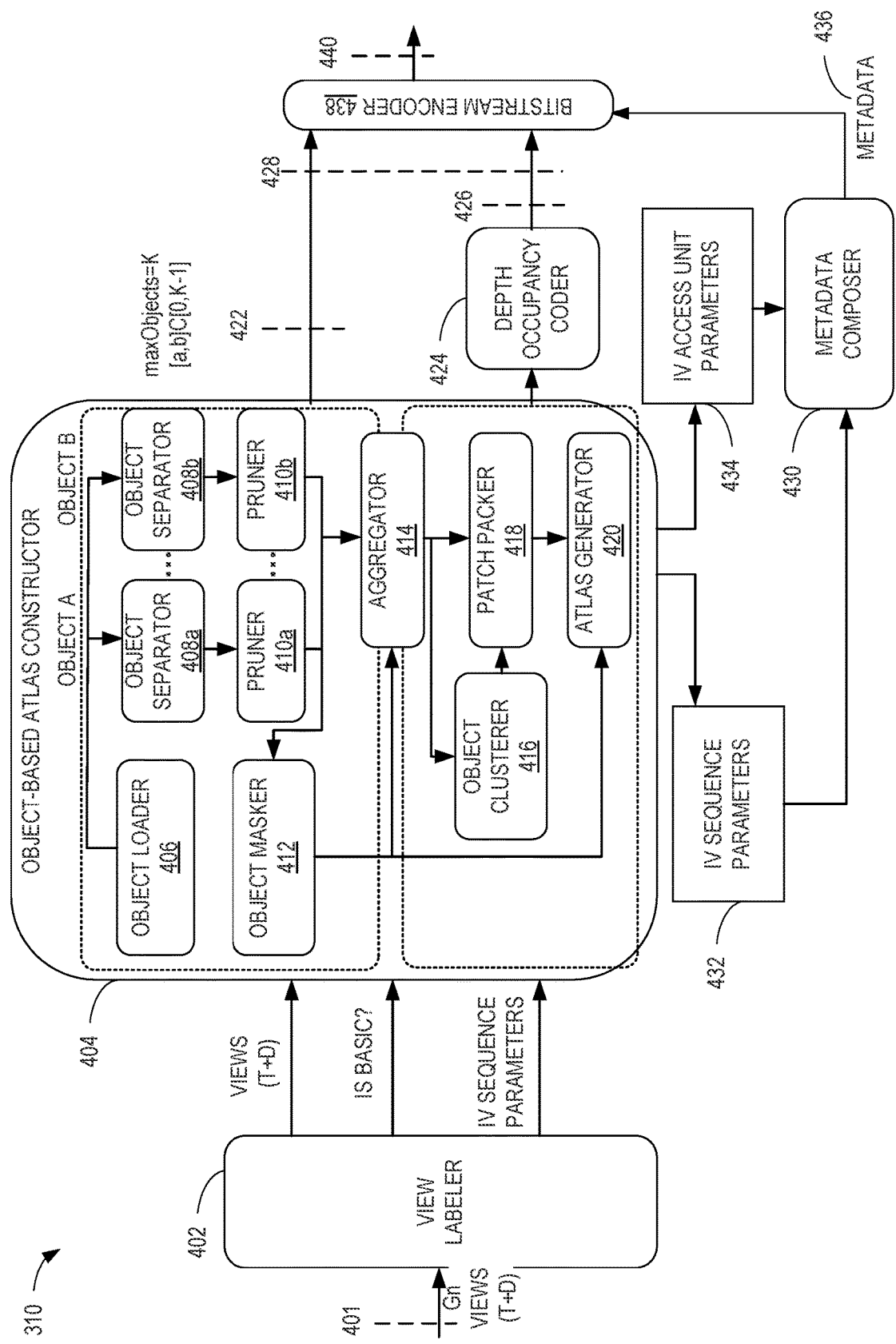
FIG. 4 illustrates an example block diagram of an example implementation of the example object-based MIV encoder included in the example object-based MIV coding system of FIG. 3.

FIG. 4 illustrates an example block diagram of an example implementation of the example object-based MIV encoder 310 included in the example object-based MIV coding system 300 of FIG. 3. The example object-based MIV encoder 310 includes an example view labeler 402, an example object-based atlas constructor 404, an example depth occupancy coder 424, an example metadata composer 430, and an example bitstream encoder 438.

The example view labeler 402 selects views to encode. For example, the view labeler 402 analyzes example input views 401 and selects which views to encode. The example input views 401 include texture images and depth images. Additionally or alternatively, the input views 401 include object maps corresponding to the texture and depth images. For example, the pixels of the object maps include an object ID identifying the object represented in the corresponding pixels of the texture and depth images. In some examples, the view labeler 402 labels views of the input views 401 as a basic view or an additional view. In some examples, the view labeler 402 outputs the input views as either a basic view or an additional view. In such examples, the example object-based MIV encoder 310 generates one or more atlases with complete views and patches taken from the additional views. As used herein, complete views correspond to the basic views. Additionally or alternatively, the example view labeler 402 outputs only basic views (e.g., the view labeler 402 filters out additional views). In such examples, the example object-based MIV encoder 310 generates one or more atlases with only complete views.

The example object-based atlas constructor generates atlases. The example object-based atlas constructor 404 includes an example object loader 406, an example object separator 408a, an example object separator 408b, an example pruner 410a, an example pruner 410b, an example object masker 412, an example aggregator 414, an example object clusterer 416, an example patch packer 418, and an example atlas generator 420. For example, the object loader 406, the object separators 408a, 408b, the example pruners 410a, 410b, and the example object masker 412 perform frame level operations. The example object clusterer 416, the example patch packer 418, and the example atlas generator 420 perform intra-period level operations.

The example object loader 406 obtains object maps. For example, the object loader 406 obtains object maps included in the input views 401. In examples disclosed herein, the input views 401 include texture maps, depth maps, and object maps. An object map indicates the pixels related to different objects in the scene, such that pixels from different views belonging to the same object have the same object identifier (e.g., object ID). As used herein, the terms "object ID" and "object index" are used interchangeably. The example object loader 406 obtains the associated object map of the frame being processed (e.g., a basic view, an additional view, etc.).

The example object separators 408a, 408b convert the texture and depth maps into object layers based on the associated object map of the view. As used herein, an object layer includes data (e.g., texture and/or depth) corresponding to a singular object. For example, the object separator 408a generates object layers of texture and depth maps corresponding to object A and the example object separator 408b generates object layers of texture and depth maps corresponding to object B. In some examples, the object separator 408a tags the object layer with the object ID of the object A and the object separator 408b tags the object layer with the object ID of the object B. While the illustrated example of FIG. 4 includes the object separators 408a, 408b, examples disclosed herein can include a fewer or greater number of object separators 408. For example, the object-based atlas constructor 404 can include k number of object separators 408, wherein k is the number of objects in the scene.

In some examples, the object separators 408a, 408b associate each object with a corresponding bounding box. That is, the example MIV decoder 356 and the example video renderer 362 can efficiently identify, label, localize, process, and render objects in corresponding bounding boxes rather than accessing all pixels across the atlases and/or patches. The object-based MIV encoder 310 includes a single 3D bounding box per object and updates the bounding box as needed. For example, the object separators 408a, 408b tag the bounding box with the object ID that is included in the bounding box. In examples disclosed herein, the geometry of the bounding box is specified by a starting point. In some examples, the starting point is the top left corner of the bounding box and is defined as (x, y, z) with respect to a 3D reference global coordinate system (e.g., the same coordinate system that the camera parameters list within the metadata is referenced to). The dimensions of the bounding box are defined by width (w), height (h), and depth (d) (e.g., (w, h, d)). In some examples, the dimensions of the bounding box are stored as floating point values.

The example bounding box can be signaled within a SEI message. For example, the SEI metadata indicates a rectangular cuboid per object. In some examples, the SEI message lists object labels (e.g., object IDs) where each SEI message can be used by multiple objects. For example, the object labels are indicated by the variable ar_label[ar_label_idx[i]] within the SEI message, wherein the variable ar_label_idx is the index of object parameters (e.g., bounding box, label, etc.) to be signaled and indicates the object ID of the related patches signaled in the variable atlas_params. That is, the annotated regions of SEI messages can be modified to account for 3D bounding boxes by adding front and depth components to the bounding box structure. For example, the variables ar_bounding_box_top[ar_object_idx [i]], ar_bounding_box_left[ar_object_idx [i]], ar_bounding_box_front[ar_object_idx [i]], ar_bounding_box_width [ar_object_idx [i]], ar_bounding_box_height [ar_object_idx [i]], and ar_bounding_box_depth[ar_object_idx [i]] specify the coordinates of the top-left-front corner (e.g., the starting point) and the width, height, and depth of the 3D bounding box of the ar_object_idx[i]$^{th}$ object relative to the 3D reference coordinate system.

The example pruners 410a, 410b prune the texture and depth maps to generate binary masks. As used herein, a binary mask indicates one of two values (e.g., occluded, non-occluded) for each pixel of the mask. For example, a binary mask can include a pixel value of 1 to indicate pixels to keep and a pixel value of 0 to indicate pixels to remove. That is, the example pruners 410a, 410b project the object layers of the basic views onto the object layers of the additional views and/or object layers of the previously pruned views to extract non-redundant occluded regions. For example, the pruners 410a, 410b perform pruning based on object ID. In such examples, the pruners 410a, 410b project depth maps of the object layers of the basic views onto depth maps of the object layers of the additional views to generate patches for their respective objects. The pruners 410a, 410b perform the same patching process on the associated texture maps and object maps for their respective objects. While the illustrated example of FIG. 4 includes the pruners 410a, 410b, examples disclosed herein can include a fewer or greater number of pruners 410. For example, the object-based atlas constructor 404 can include k number of pruners 410, wherein k is the number of objects in the scene. An example illustration of the pruning process based on object ID is described in further detail below in connection with FIG. 9.

The example pruners 410a, 410b can additionally or alternatively perform object-based pruning. In such examples, the view labeler 402 identifies, synthesizes, and labels basic views and additional views from the input views 401. The object separators 408a, 408b divide the basic and additional views (e.g., texture and depth maps) based on the associated object maps into multiple layers where each layer corresponds to one object. That is, the object separator 408a generates an object layer by identifying pixels corresponding to the object ID of the object A, the object separator 408b generates an object layer by identifying pixels corresponding to the object ID of the object B, etc. The example pruner 410a projects the object layers of the basic views onto the object layers of the additional views of object A and/or the object layers of the previously pruned object layers. The example pruner 410b projects the object layers of the basic views onto the object layers of the additional views of object B and/or the object layers of the previously pruned object layers. That is, each of the pruners 410 project the object layers of the basic views onto the object layers of the additional views and/or object layers of the previously pruned views corresponding to a respective single object. Thus, the example pruner 410a generates masks corresponding to object A and the example pruner 410b generates masks corresponding to object B. In some examples, the pruners 410 perform object-based pruning for each object layer of the additional views, for some object layers of the additional views, etc. An example illustration of the example object-based pruning process is described in further detail below in connection with FIG. 10.

The example pruners 410a, 410b can additionally or alternatively perform object-view pruning. In such examples, the example view labeler 402 is implemented by an example object selector. The example object selector selects one projection of each object across all views based on the object maps, texture maps, and depth maps and labels the identified projection as the basic view. That is, the object selector labels only one input view as a basic view. In examples disclosed herein, the object selector selects the projection based one or more criteria such as the pixel count from object maps, the depth range from depth maps, and/or the number of features from texture maps. For example, the object selector selects the view having the largest pixel count from object maps (e.g., the view including the largest number of objects), the widest depth range from depth maps, and/or the maximum number of features from the texture maps in comparison to the remaining projections. The object selector labels the remaining views as additional views. The example pruner 410a projects the object layer of the basic view onto the object layers of the additional views and/or object layers of the previously pruned views of object A. The example pruner 410b projects the object layer of the basic view onto the object layers of the additional views and/or object layers of the previously pruned views of object B. That is, the pruners 410 project the object layer of the basic view onto the object layers of the additional views and/or object layers of the previously pruned views corresponding to a single object. Thus, the example pruner 410a generates masks corresponding to object A and the example pruner 410b generates masks corresponding to object B. In some examples, the pruners 410 perform object-view pruning for each object layer of the additional views, for some object layers of the additional views, etc. An example illustration of the example object-view pruning process is described in further detail below in connection with FIG. 11.

The example object masker 412 obtains pruning masks (e.g., the masks generated by the example pruners 410a, 410b). In examples disclosed herein, the pixels of the basic views' masks by default are turned on (e.g., the pixels of the basic views' masks are set to the maximum grey level). That is, the basic views' masks denote that the entire basic views are streamed in whole patches. However, in object-based coding, no patch can have pixels that correspond to more than one object (e.g., the patches each correspond to a respective singular object). Thus, the example object masker 412 refines the basic views' masks based on the object maps such that only the pixels corresponding to the object of the patch are turned on. Additionally or alternatively, the example object masker 412 refines the additional views' masks based on the object maps such that only the pixels corresponding to the object of the patch area are turned on. That is, the example object masker 412 generate refined masks for basic views and/or additional views.

The example object masker 412 generates object masks based on the refined masks. That is, the example object masker 412 assigns the object ID of the patch to the pixels of the refined masks that are turned on. The example object masker 412 merges the object masks with object masks of the previous iteration (e.g., previous frame). This allows the example object-based atlas constructor 404 to track object IDs and tag patches with the corresponding object ID at a relatively later time. Additionally or alternatively, the object masker 412 merges the object layers generated by the example object separators 408a, 408b.

The example aggregator 414 obtains the masks generated by the example pruners 410a, 410b. For example, the aggregator 414 terminates the accumulation of masks after the object loader 406, the object separators 408a, 408b, the pruners 410a, 410b, and the object masker 412 have processed all frames within an intra-period. That is, the example aggregator 414 aggregates pruning binary masks (e.g., generated by the example pruners 410a, 410b) and/or merged multi-level object masks (e.g., generated by the object masker 412) to account for motion across frames within the intra-period. For example, the aggregator 414 accumulates pruning masks per object layer (e.g., per object represented in the input views) per view (e.g., the basic views, the additional views, etc.) over a number of frames (e.g., frames of an intra-period).

The example object clusterer 416 generates clusters of masks to generate patches. That is, the example object clusterer 416 filters and removes binary masks based on object masks. For example, the object clusterer 416 clusters and extracts adjacent (e.g., neighboring, etc.) pixels to generate patches based on the aggregated pruning masks per object layer per view (e.g., generated by the aggregator 414). For example, the object clusterer 416 performs clustering per object and tags the resulting clusters with the associated object ID. Thus, each patch corresponds to a single object. In some examples, the patches are made of multiple blocks. As used herein, a block is a group of one or more pixels. For example, a block can be a group of eight pixels. However, a block can include a greater or fewer number of pixels. The example object clusterer 416 orders the clusters based on how many active pixels are included, unless the clusters belong to basic views. Additionally or alternatively, the object clusterer 416 can order the clusters based on patch area, etc.

The example patch packer 418 generates patch metadata. For example, the patch packer 418 obtains the clusters (e.g., patches) from the object clusterer 416. In some examples, the patch packer 418 identifies the location of each patch generated by the object clusterer 416 in an atlas. For example, the patch packer 418 generates a block to patch map to be included in the metadata. For example, the block to patch map maps blocks to the patches they belong to. In examples disclosed herein, the patch packer 418 tags the patch with the same object ID as the cluster. That is, each patch is tagged with an object ID of the object it is associated with.

The example atlas generator 420 packs the patches into atlases. For example, the atlas generator 420 obtains the patches generated by the object clusterer 416 and/or patch metadata generated by the patch packer 418 and writes the texture and depth content of the patches. For example, the atlas generator 420 receives object views generated by the example object masker 412 to extract the texture and depth content of the patch. In some examples, the atlas generator 420 adds the corresponding object ID of the patch in the associated atlas patch parameters list. In examples in which patches area extracted per object (e.g., the pruners 410a, 410b perform object-based pruning and/or object-selected pruning), the atlas generator 420 packs the patches next to each other and/or within the same atlas, reducing the required bandwidth for coding and streaming these atlases.

The example object-based atlas constructor 404 generates an example encoded texture component 422. The example depth occupancy coder 424 encodes depth content to generate an example encoded depth component 426. The example encoded texture component 422 and the example encoded depth component 426 form an example atlas 428.

The example metadata, composer 430 generates example metadata 436. For example, the metadata composer 430 obtains example immersive video (IV) sequence parameters 432 and example IV access unit parameters 434. For example, the IV sequence parameters 432 include view parameters (e.g., the location, orientation, depth range, etc. of the video capturer(s) 304). The example IV access unit parameters 434 include frame parameters. For example, the IV access unit parameters 434 include information per atlas (e.g., atlas data, patch information associated with atlases, etc.) and metadata (atlas size, atlas depth threshold, atlas scaling, etc.). The example metadata composer 430 multiplexes the IV sequence parameters 432 and the IV access unit parameters 434 into the metadata 436.

In examples disclosed herein, the metadata composer 430 includes the object ID per patch and/or the number of objects in the IV access unit parameters 434 (e.g., the atlas (patch) parameters list metadata). In some examples, the number of objects is represented using the variable num_objects. The number of bits used to represent the object ID is based on the number of bits required to signal the number of objects in the scene (e.g., ceil(log2(num_objects))). The ceil(n) function returns the smallest possible integer value which is greater than or equal to the input, n. For example, ceil(2.8) returns the integer 3. The log2(x) function returns the base-2 logarithm of the input, x. For example, log2(2) returns the value 1. Additionally or alternatively, the number of bits used to signal the object ID can be a fixed length based on the number of objects supported by the example object-based MIV encoder 310.

As illustrated in Table 1 below, the num_objects can be added in a data structure (e.g., atlas_params_list) that defines atlas parameters (e.g., atlas_params).

TABLE 1

| | Descriptor |
|---|---|
| atlas_params_list( ){ | |
|   num_atlases_minus1 | ue(v) |
|   num_objects | u(16) |
|   omaf_v1_compatible_flag | u(1) |
|   for ( i = 0; I <= num_atlases_minus1; i++){ | |
|     atlas_id[ i ]; | u(8) |
|     atlas_params( atlas_id[ i ] ) | |
|   } | |
| } | |

| | Descriptor |
|---|---|
| atlas_params( a ){ | |
|   num_patches_minus1[ a ] | u(16) |
|   atlas_width[ a ] | u(16) |
|   atlas_height[ a ] | u(16) |
|   for ( i = 0; i <= num_patches_minus1; i++){ | |
|     view_id[ a ][ i ] | u(v) |
|     object_id[ a ][ i ] | u(v) |
|     patch_width_in_view[ a ][ i ] | u(v) |
|     patch_height_in_view[ a ][ i ] | u(v) |
|     patch_pos_in_atlas_x[ a ][ i ] | u(v) |
|     patch_pos_in_atlas_y[ a ][ i ] | u(v) |
|     patch_pos_in_view_x[ a ][ i ] | u(v) |
|     patch_pos_in_view_y[ a ][ i ] | u(v) |
|     patch_rotation[ a ][ i ] | u(3) |
|   } | |
| } | |

In the example Table 1, the variable num_objects indicates the total number of objects indexed in the object maps across all views of the immersive video content and the variable object_id[a][i] indicates the object ID of the $i^{th}$ patch of the $a^{th}$ atlas within the view_id[a ][i]$^{th}$ view. For example, the atlas parameters list includes the number of objects (e.g., num_objects) in the scene. The patch parameters list (e.g., illustrated in atlas_params(a)) includes the object ID of each patch (e.g., objectID[a][i]).

In some examples, the pruners 410a, 410b do not perform a pruning process that generates patches containing only a single object. In such examples, the metadata composer 430 signals the object ID as an additional component that is mapped into atlases and coded with the object-based MIV encoder 310. For example, for each pixel position, the pixel value is set equal to the object ID. In some examples, the number of allowable objects is limited by the number of bits used in the video coding (e.g., $2^{number\ of\ bits}$).

In some examples, the metadata composer 430 includes a patch rate parameter per patch in the parameters e.g., the IV access unit parameters 434). The patch rate parameter enables varying patch rates (e.g., the rate a patch is generated and/or encoded). For example, the object-based MIV encoder 310 determines to encode objects of interest at a higher patch rate and, thus, the metadata composer 430 stores the patch rate in the metadata. Additionally or alternatively, the metadata composer 430 stores a scaling parameter for each object (e.g., in the bounding box SEI message). That is, the scaling parameter identifies the resolution used to form patches. In some examples, the metadata composer 430 signals the scaling parameter for each atlas, for each object ID, for each patch, etc. The example metadata composer 430 combines the example IV sequence parameters 432 and the example IV access unit parameters 434 to generate the example metadata 436. The example bitstream encoder 438 multiplexes the example atlas 428 and the example metadata 436 to form an example encoded bitstream 440. For example, the encoded bitstream 440 is a Visual Volumetric Video-based Coding (V3C) sample stream with MIV extensions and related SEI messages. In some examples, the object ID for each patch is included in the encoded bitstream 440 (e.g., the patch is tagged with the object ID), the object ID is stored in the related SEI messages, etc.

Figure 5:
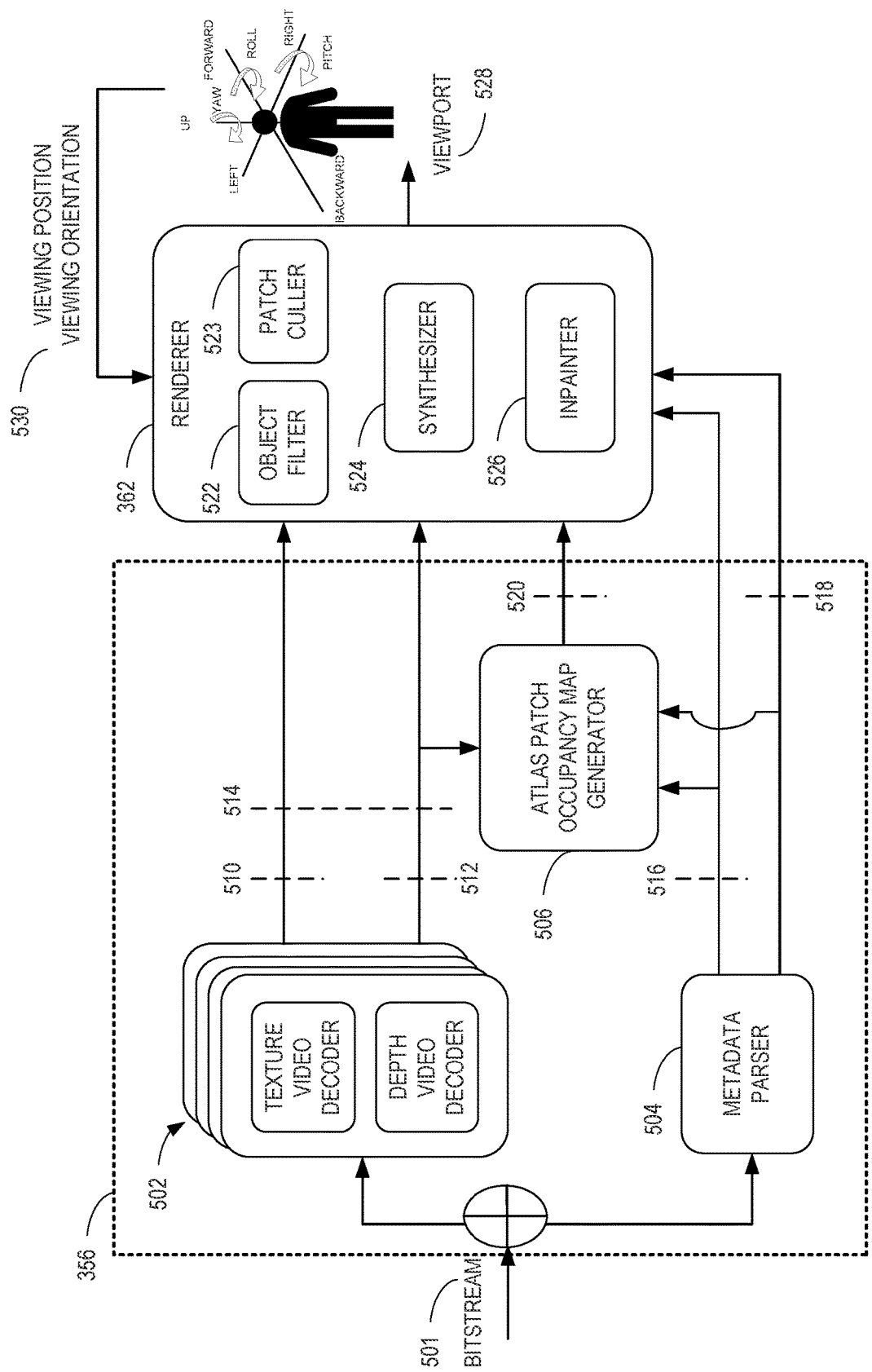
FIG. 5 illustrates an example block diagram of an example implementation of the example MIV decoder and the example renderer included in the example object-based MIV coding system of FIG. 3.

FIG. 5 illustrates an example block diagram of an example implementation of the example MIV decoder 356 and the example video renderer 362 included in the example object-based MIV coding system 300 of FIG. 3. The example MIV decoder 356 includes an example video decoder 502, an example metadata parser 504, and an example atlas patch occupancy map generator 506.

The example MIV decoder 356 receives an example encoded bitstream 501 (e.g., the encoded bitstream 440 generated by the example object-based MIV encoder 310). The example video decoder 502 generates a sequence of decoded picture pairs of example decoded texture pictures 510 and example decoded depth pictures 512. In examples disclosed herein, the example decoded texture pictures 510 and the example decoded depth pictures 512 represent an example atlas 514. For example, the video decoder 502 can be an HEVC decoder. In some examples, the video decoder 502 includes a video texture decoder and a video depth decoder.

The example metadata parser 504 parses the example encoded bitstream 501 to generate example IV access unit parameters 516 and example IV sequence parameters 518. For example, the metadata parser 504 parses the encoded bitstream 501 for the example IV access unit parameters 434 (FIG. 4) to generate the IV access unit parameters 516. Additionally or alternatively, the example metadata parser 504 parses the encoded bitstream 501 for the example IV sequence parameters 432 (FIG. 4) to generate the example IV sequence parameters 518.

The example atlas patch occupancy map generator 506 generates an example atlas patch occupancy map 520. In examples disclosed herein, the atlas patch occupancy map 520 is the same size as the atlas 514 and indicates whether pixels of the atlas are occupied. For example, the atlas patch occupancy map generator 506 accesses the example decoded depth pictures 512, the IV access unit parameters 516, and the example IV sequence parameters 518 to associate the pixels of the decoded depth pictures 512 with the atlas 514. In examples disclosed herein, the atlas patch occupancy map generator 506 filters objects based on object IDs. For example, the atlas patch occupancy map generator 506 sets the occupancy of pixels corresponding to patches that are to be filtered out to unoccupied.

The example video renderer 362 includes an example object filter 522, an example patch culler 523, an example synthesizer 524, and an example inpainter 526. The example object filter 522 filters pixels based on the occupancy map 520. For example, the object filter 522 determines which pixels to render based on whether corresponding pixels of the occupancy map 520 are occupied (e.g., the occupied pixels of the occupancy map correspond to objects that are to be rendered). In some examples, the object filter 522 identifies the associated bounding box using the object ID of the selected object. That is, the object filter 522 performs object filtering. For example, the object filter 522 removes patches of the objects to be filtered out from the atlas data. For example, the object filter 522 identifies the object IDs of the objects to be removed and removes the patches corresponding to the identified object IDs. In some examples, the object filter 522 removes the patch by removing the one or more blocks that make up the patch. For example, the object filter 522 identifies and removes block(s) corresponding to the identified patches from the block to patch map (e.g., generated by the example metadata parser 504). That is, the object filter 522 modifies the block to patch map such that pixels (e.g., blocks) of patches that correspond to the objects of interest (e.g., objects to be rendered) are identified (e.g., using the object IDs associated with their patch metadata) and kept in the block to patch map while pixels of patches that correspond to objects not of interest are filtered out (e.g., pixels set to unoccupied values).

The example patch culler 523 performs patch culling based on an example viewing position and viewing orientation 530 (e.g., a target view). The patch culler 523 can receive the viewing position and viewing orientation 530 from a user. The patch culler 523 filters out blocks from the atlas data based on the block to patch map that are not visible based on the target viewing position and viewing orientation 530.

The example synthesizer 524 reconstructs the pruned views. For example, the synthesizer 524 copies the patches from the atlases (e.g., the patches that were not filtered out by the object filter 522 and/or the patches that were not culled by the patch culler 523) to images corresponding to each input view. The example synthesizer 524 synthesizes a view based on the patches in the input view. For example, the synthesizer 524 can be implemented by a Reference View Synthesizer (RVS). Additionally or alternatively, the synthesizer 524 can be implemented by a View Weighting Synthesizer (VWS).

The example inpainter 526 fills inactive pixels. That is, the example object filter 522 filters out pixels corresponding to objects that are not to be rendered. Thus, there may be missing information between pixels of the selected objects (e.g., corresponding to objects that were filtered out). The example inpainter 526 converts the inactive pixels to a neutral (e.g., a grey color). The use of a neutral filling reduces stretched artifacts (e.g., if the example inpainter 526 generates information for the inactive pixels instead of using a neutral filling).

The example video renderer 362 generates an example viewport 528. For example, the video renderer 362 accesses one or more of the decoded atlases 514, the IV access unit parameters 516, and the example IV sequence parameters 518, the atlas patch occupancy map 520, and the viewer position and orientation 530. That is, the example video renderer 362 outputs a perspective viewport of the texture images of the selected objects based on the example viewer position and orientation 230.

Figure 6:
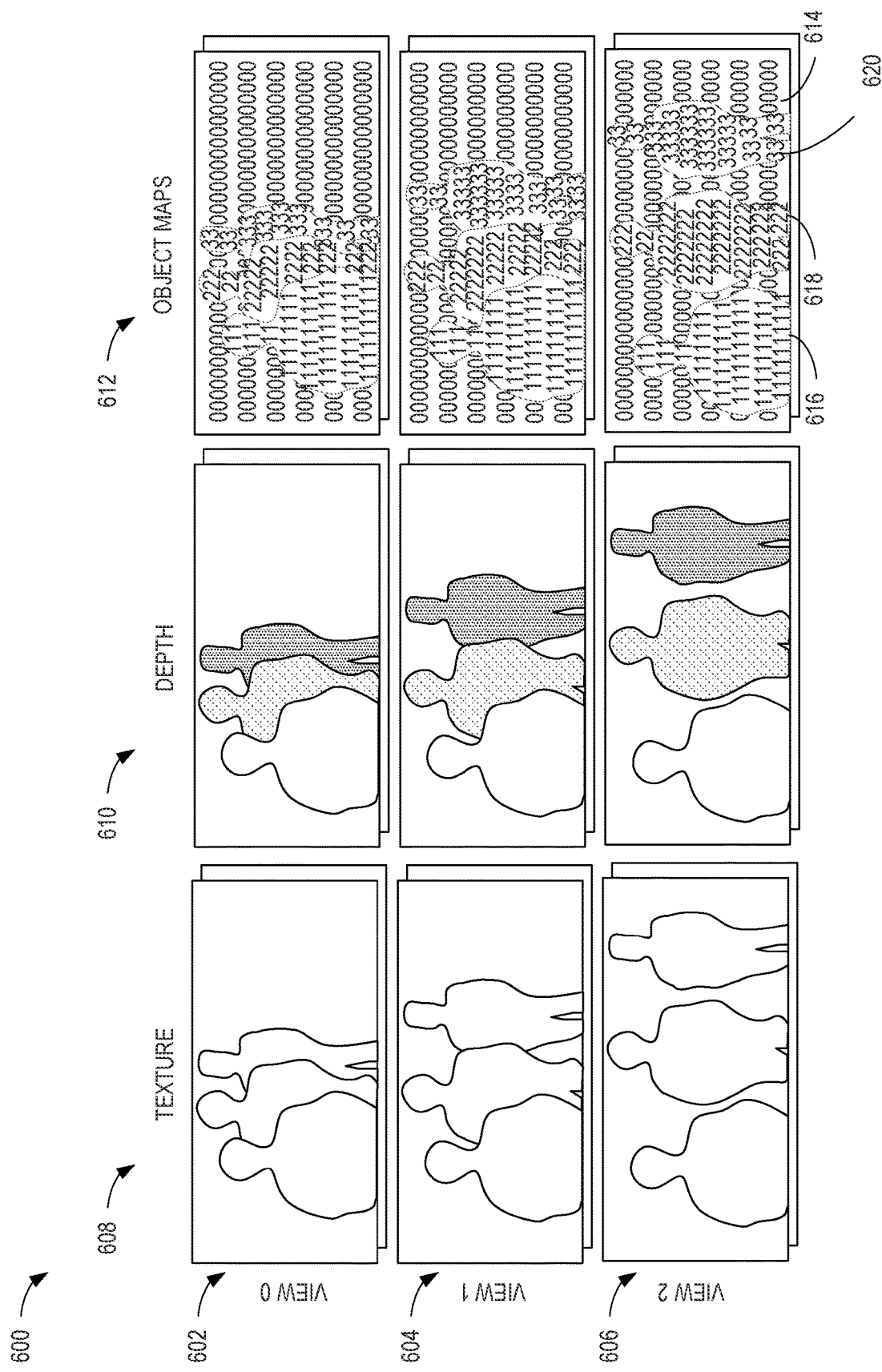
FIG. 6 illustrates example immersive data.

FIG. 6 illustrates example immersive data 600. The example immersive data 600 includes an example first view 602, an example second view 604, and an example third view 606. For example, the views 602, 604, 606 are captured from three different cameras at three different angles relative to each other. For example, the first view 602 is the view 0, the second view 604 is the view 1, and the third view 606 is the view 2. The example immersive data 600 includes example texture maps 608. That is, there is an example texture map 608 for each of the views 602, 604, 606. The example immersive data 600 includes example depth maps 610. That is, there is an example depth map 610 for each of the views 602, 604, 606.

The example immersive data 600 includes example object maps 612. That is, there is an example object map 612 for each of the views 602, 604, 606. For example, the object maps 612 include an example first object ID 614, an example second object ID 616, an example third object ID 618, and an example fourth object ID 620. For example, the first object ID 614 has a value of 0 and corresponds to the background of the views 602, 604, 606, the second object ID 616 has a value of 1 and corresponds to the first person of the views 602, 604, 606, the third object ID 618 has a value of 2 and corresponds to the second person of the views 602, 604, 606, and the fourth object ID 620 has a value of 3 and corresponds to the third person in the views 602, 604, 606. That is, the same four objects captured in the views 602, 604, 606 are tagged with a corresponding object ID, such that the same object has the same object ID in each object map 612 of the views 602, 604, 606. Each pixel of the object maps 612 corresponds to the object ID of the respective object. For example, the views 602, 604, 606 include the first person. Thus, the object maps 612 of the views 602, 604, 606 include the first object ID at the pixel location representative of the first person.

Figure 7:
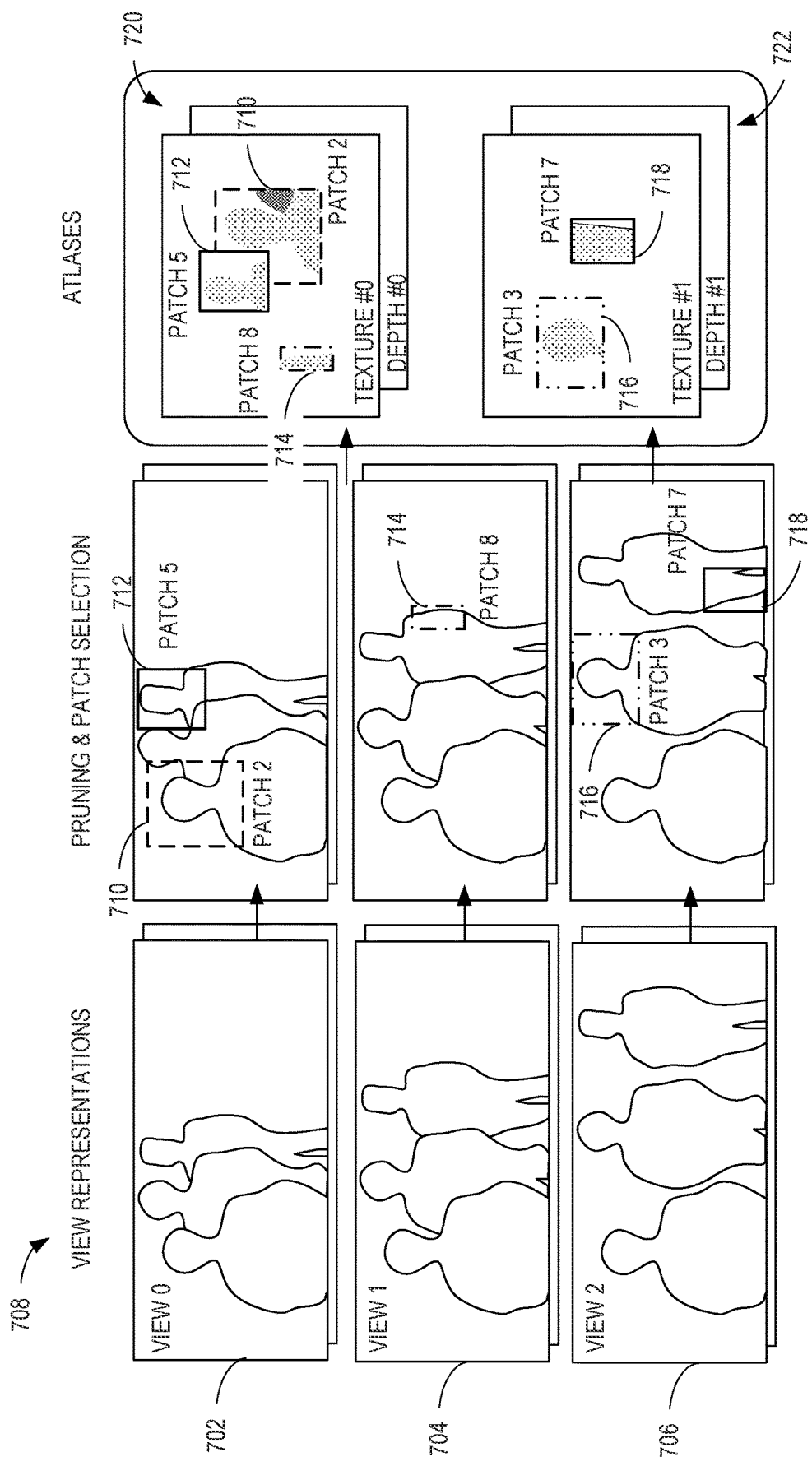
FIG. 7 illustrates example input views and patches.

FIG. 7 illustrates example input views and patches. The input views include an example first 702, an example second 704, and an example third 706. For example, the first view 702 is the view 0, the second view 704 is the view 1, and the third view 706 is the view 2. For example, the views 702, 704, 706 include view representations 708 (e.g., texture maps, depth maps, object maps). In the illustrated example of FIG. 7, the view representations 708 of the views 702, 704, 706 include three people. That is, the views 702, 704, 706 are captured from three different cameras at three different angles with respect to the three people.

The example pruners 410a, 410b (FIG. 4) prune the views 702, 704, 706 to generate patches. For example, the first view 702 includes an example first patch 710 and an example second patch 712, the second view 704 includes an example third patch 714, and the third view 706 includes an example fourth patch 716 and an example fifth patch 718. In examples disclosed herein, each patch corresponds to one respective object. For example, the first patch 710 corresponds to a first person's head, the second patch 712 corresponds to a second person's head, the third patch 714 corresponds to the second person's arm, the fourth patch 716 corresponds to a third person's head, and the fifth patch corresponds to the second person's leg.

In some examples, the patch packer 418 (FIG. 4) tags the patches with patch IDs. For example the patch packer 418 tags the first patch 710 with a patch ID of 0, the second patch 712 with a patch ID of 1, the third patch 714 with a patch ID of 2, the fourth patch 716 with a patch ID of 3, and the fifth patch 718 with a patch ID of 4. Additionally or alternatively, the patch packer 418 tags the patches with object IDs. For example, the patch packer 418 tags the patches with the object ID of the object represented in the views 702, 704, 706. For example, the first patch 710 is tagged with an object ID of 0, the fourth patch 716 is tagged with an object ID of 1, and the second patch 712, the third patch 714, and the fifth patch 718 are tagged with an object ID of 2.

The example atlas generator 420 (FIG. 4) generates an example first atlas 720 and an example second atlas 722. The atlases 720, 722 include a texture map and a depth map. The example first atlas 720 includes the example first patch 710, the example second patch 712, and the example third patch 714. The example second atlas 722 includes the example fourth patch 716 and the example fifth patch 718.

Figure 8:
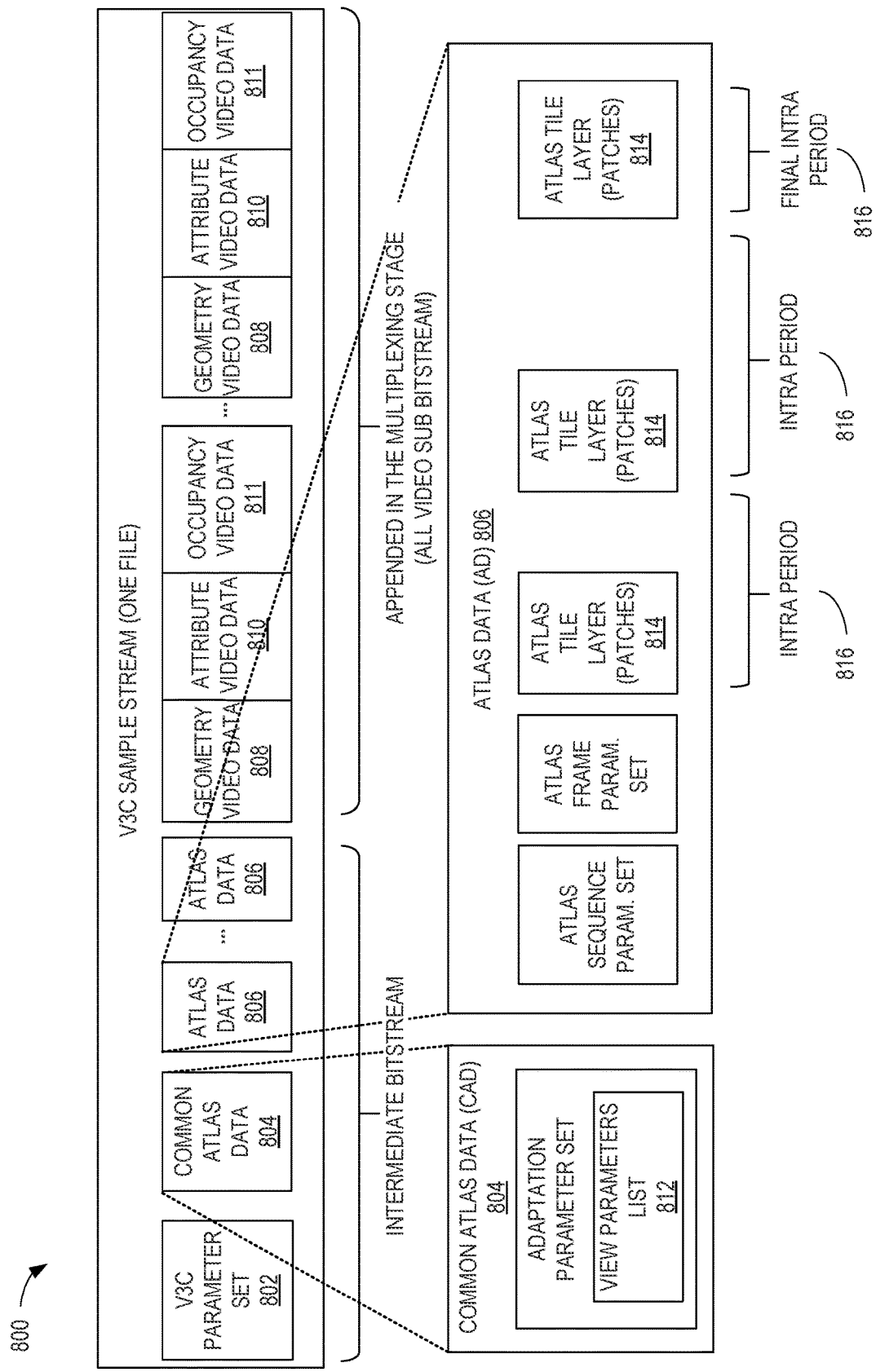
FIG. 8 illustrates an example Video-Based Volumetric Video Coding (V3C) sample stream with MIV extensions.

FIG. 8 illustrates an example V3C sample stream with MIV extensions 800 (e.g., an example V3C sample stream 800). For example, the object-based MIV encoder 310 generates the V3C sample stream 800. The example V3C sample stream 800 includes an example V3C parameter set 802, example common atlas data 804, example atlas data 806, example geometry video data 808, example attribute video data 810, and example occupancy video data 811.

For example, the V3C parameter set 802 includes example IV access unit parameters 516 and example IV sequence parameters 518. The example common atlas data 804 includes an example view parameters list 812. For example, the common atlas data 804 contains an atlas sub bitstream, but the main Network Abstraction Layer (NAL) unit is the common atlas frame (CAF) that contains the view parameters list 812 or updates thereof. The example atlas data 806 is a NAL sample stream, which includes example SEI messages. For example, the atlas data 806 includes an atlas tile layer (ATL) that carries a list of patch data units (PDU). In examples disclosed herein, each PDU describes the relation between a patch in an atlas and the same patch in a hypothetical input view. The example atlas data 806 includes example atlas tile layers 814 (e.g., patch data 814). For example, the patch data 814 is sent only for example intra-periods 816 (e.g., once per intra-period 816). In some examples, a frame order count NAL unit is used to skip all interframes at once.

Figure 9:
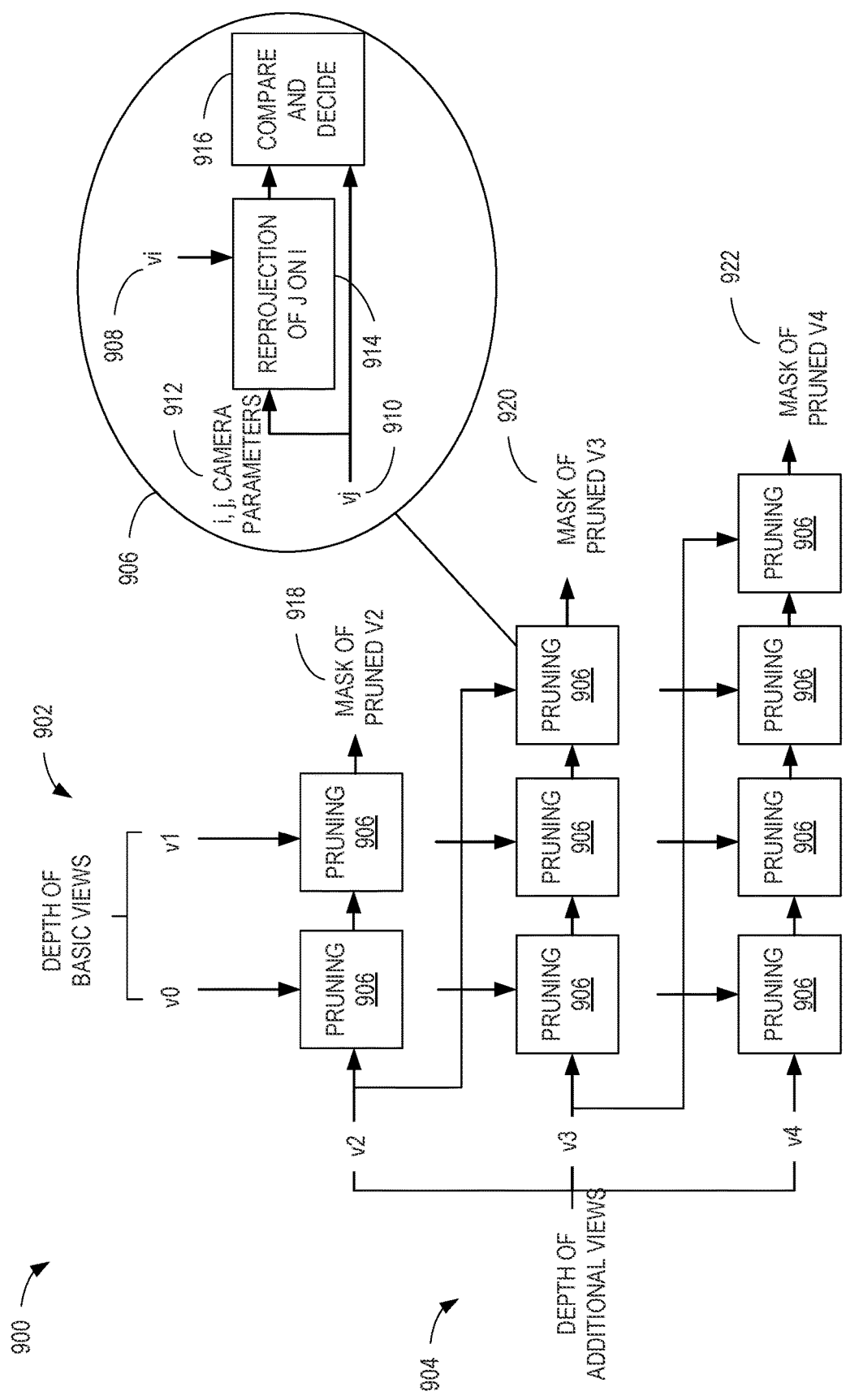
FIG. 9 illustrates an example pruning graph for example basic views and example additional views.

FIG. 9 illustrates an example pruning graph 900 for example basic views 902 and example additional views 904. For example, the basic views 902 include an example first view v0 and an example second view v1. The example additional views 904 include an example third view v2, an example fourth view v3, and an example fifth view v4. In some examples, the view labeler 402 (FIG. 4) labels the first view v0 and the second view v1 as basic views and labels the third view v2, the fourth view v3, and the fifth view v4 as additional views. In the illustrated example of FIG. 9, the basic views 902 and the additional views 904 are the corresponding depth maps of the views v0, v1, v2, v3, v4.

The example pruning graph 900 includes a plurality of example pruning blocks 906. For example, the pruners 410a, 410b (FIG. 4) receive an example first view $v_i$ 908, an example second view $v_j$ 910, and example camera parameters 912. At block 914, the example pruners 410a, 410b project the depth maps of the first view $v_i$ 908 onto the depth maps of the second view $v_j$ 910. At block 916, the example pruners 410a, 410b compare the views 908, 910 and determines whether to prune the views (e.g., generate a mask). The example pruners 410a, 410b generate an example first mask 918, an example second mask 920, and an example third mask 922. For example, the first mask 918 is a mask of the pruned third view v2, the second mask 920 is a mask of the pruned fourth view v3, and the third mask 922 is a mask of the pruned fourth view v4.

Figure 10:
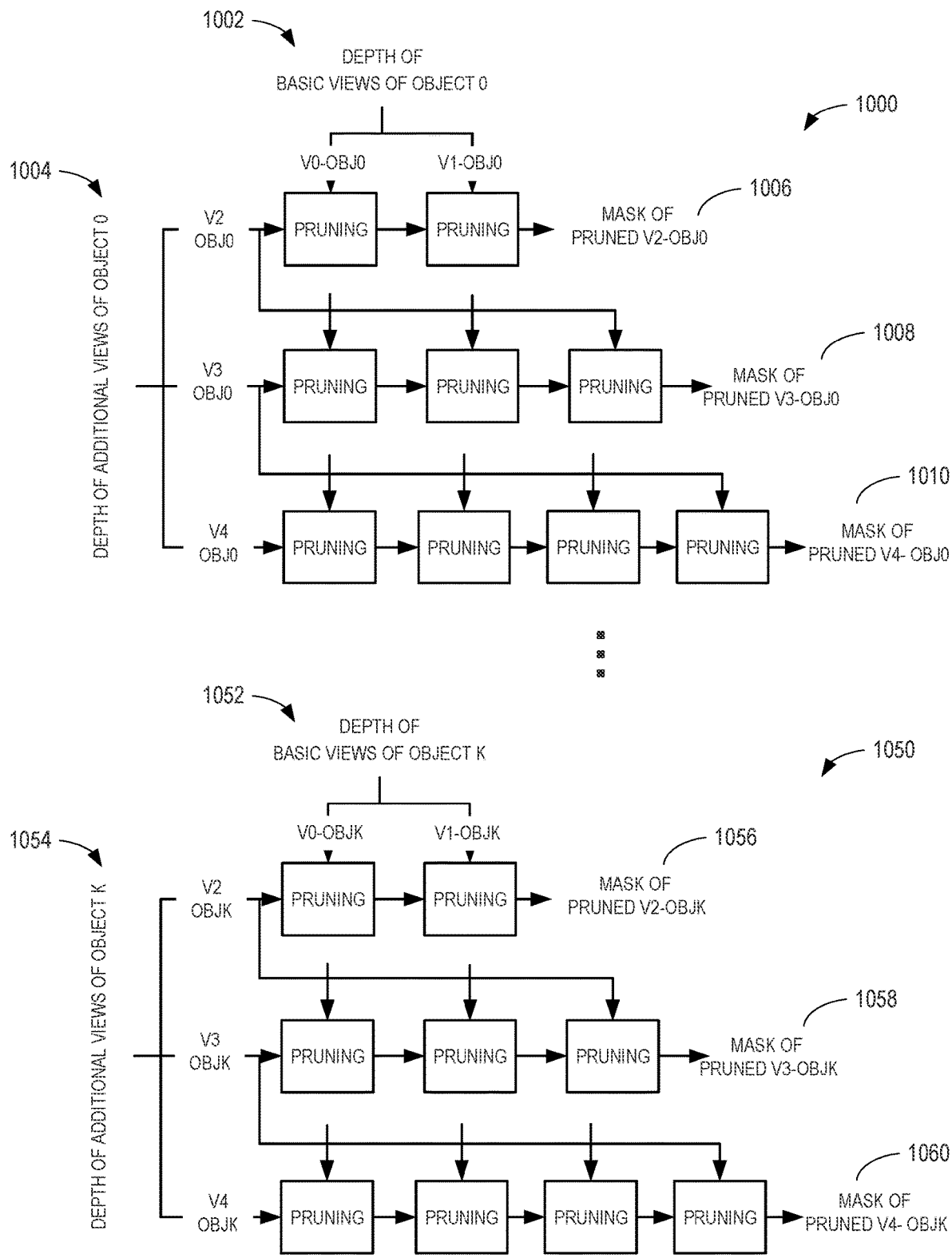
FIG. 10 illustrates an example object-based pruning process.

FIG. 10 illustrates an example object-based pruning process. The illustrated example of FIG. 10 includes an example first pruning graph 1000 and an example second pruning graph 1050. The example first pruning graph 1000 includes example basic views 1002 and example additional views 1004. For example, the basic views 1002 include an example first view v0 and an example second view v1. The example additional views 1004 include an example third view v2, an example fourth view v3, and an example fifth view v4. In some examples, the view labeler 402 (FIG. 4) labels the first view v0 and the second view v1 as basic views and labels the third view v2, the fourth view v3, and the fifth view v4 as additional views. In the illustrated example of FIG. 10, the basic views 1002 and the additional views 1004 are the corresponding depth maps of the views v0, v1, v2, v3, v4.

The example first pruning graph 1000 corresponds to a first object. For example, the object separator 408a (FIG. 4) identifies the object ID of the first object based on an object map (not illustrated) and generates object layers for each view corresponding to the object ID of the first object. The example pruner 410a performs pruning (e.g., block 906 of FIG. 9). For example, the pruner 410a projects the object layers of the basic views 1002 onto the object layers of the additional views 1004 to generate an example first mask 1006, an example second mask 1008, and an example third mask 1010. For example, the first mask 1006 is a mask of the pruned third view v2 of the first object, the second mask 1008 is a mask of the pruned fourth view v3 of the first object, and the third mask 1010 is a mask of the pruned fifth view v4 of the first object.

The example second pruning graph 1050 includes example basic views 1052 and example additional views 1054. For example, the basic views 1052 include an example first view v0 and an example second view v1. The example additional views 1054 include an example third view v2, an example fourth view v3, and an example fifth view v4. In the illustrated example of FIG. 10. The example second pruning graph 1050 corresponds to the $k^{th}$ object. That is, the basic views 1052 and the additional views 1054 are the corresponding depth maps of the views v0, v1, v2, v3, v4 corresponding to the $k^{th}$ object. That is, the example views 1052, 1054 represent the object layers of the $k^{th}$ object. For example, the object separator 408b (FIG. 4) identifies the object ID of the $k^{th}$ object based on the object map (not illustrated). The example pruner 410b performs pruning (e.g., block 906 of FIG. 9). For example, the pruner 410b projects the object layers of the basic views 1052 onto the object layers of the additional views 1054 of the $k^{th}$ object to generate an example first mask 1056, an example second mask 1058, and an example third mask 1060. For example, the first mask 1056 is a mask of the pruned third view v2 of the $k^{th}$ object, the second mask 1058 is a mask of the pruned fourth view v3 of the $k^{th}$ object, and the third mask 1010 is a mask of the pruned fifth view v4 of the $k^{th}$ object.

Figure 11:
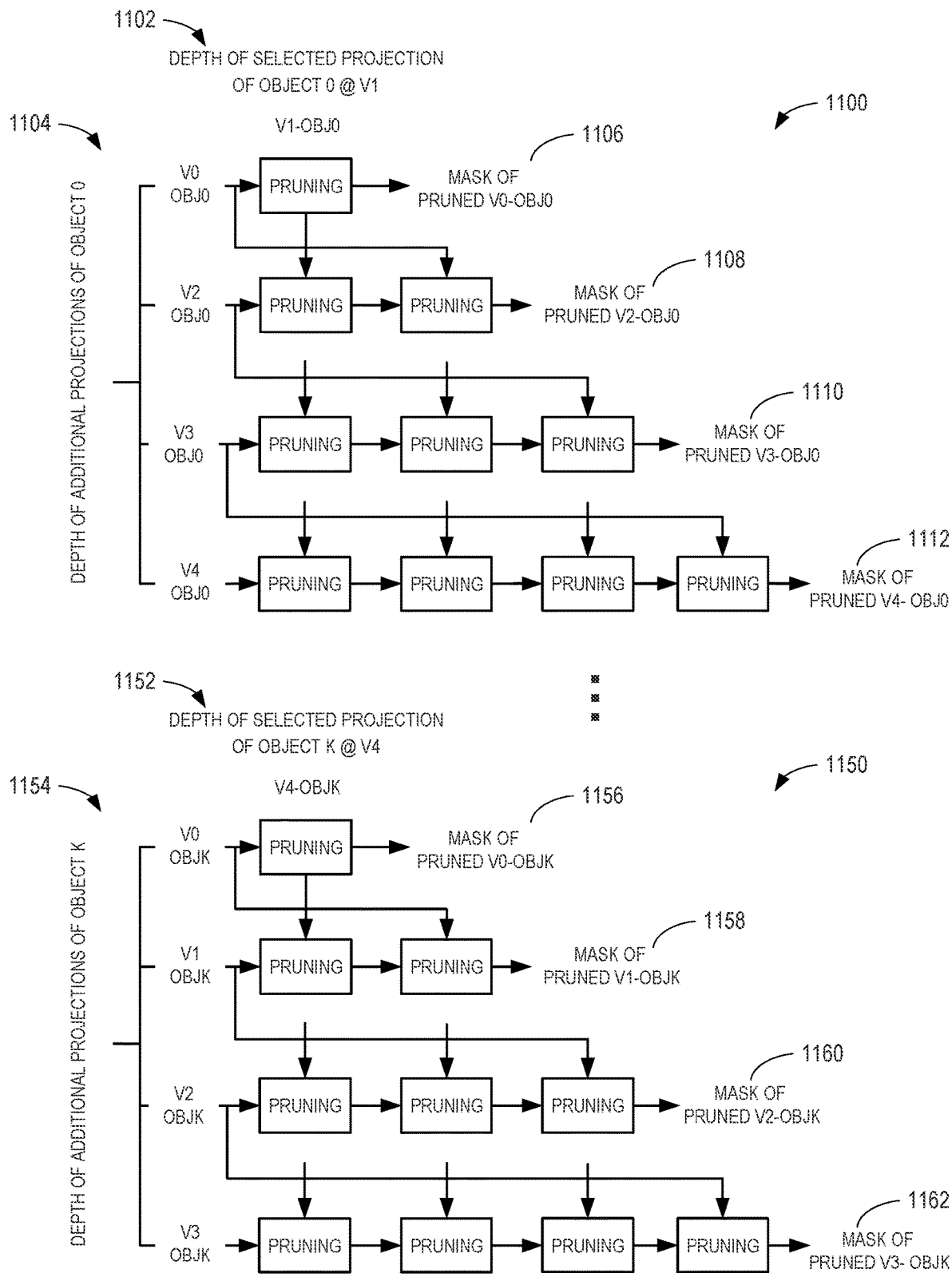
FIG. 11 illustrates an example object-view pruning scheme.

FIG. 11 illustrates an example object-view pruning scheme. The illustrated example of FIG. 11 includes an example first pruning graph 1100 and an example second pruning graph 1150. The example first pruning graph 1100 includes an example basic view 1102 and example additional views 1104. For example, the basic view 1102 is an example second view v1. The example additional views 1104 include an example first view v0, an example third view v2, an example fourth view v3, and an example fifth view v4. In some examples, the view labeler 402 (FIG. 4) labels the second view v1 as the basic view and labels the first view v0, the third view v2, the fourth view v3, and the fifth view v4 as additional views. In the illustrated example of FIG. 11, the basic views 1102 and the additional views 1104 are the corresponding depth maps of the views v0, v1, v2, v3, v4. The example first pruning graph 1100 corresponds to a first object. For example, the object separator 408a (FIG. 4) identifies the object ID of the first object based on an object map (not illustrated). The example pruner 410a performs pruning (e.g., block 906 of FIG. 9). For example, the pruner 410a projects the object layer of the basic view 1102 onto the object layers of the additional views 1104 of the first object to generate an example first mask 1106, an example second mask 1108, an example third mask 1110, and an example fourth mask 1112. For example, the first mask 1106 is a mask of the pruned first pruned view v0 of the first object, the second mask 1108 is a mask of the pruned third view v2 of the first object, the third mask 1110 is a mask of the pruned fourth view v3 of the first object, and the fourth mask 1112 is a mask of the pruned fifth view v4 of the first object.

The example second pruning graph 1150 includes an example basic view 1152 and example additional views 1154. For example, the basic view 1152 is an example fifth view v4. The example additional views 1154 include an example first view v0, an example second view v1, an example third view v2, and an example fourth view v3. In some examples, the view labeler 402 labels the fifth view v4 as the basic view and labels the first view v0, the second view v1, the third view v2, and the fourth view v3 as additional views. In the illustrated example of FIG. 11, the basic view 1152 and the additional views 1154 are the corresponding depth maps of the views v0, v1, v2, v3, v4. The example second pruning graph 1150 corresponds to the $k^{th}$ object. That is, the example views 1152, 1154 represent the object layers of the $k^{th}$ object. For example, the object separator 408b (FIG. 4) identifies the object ID of the $k^{th}$ object based on the object map (not illustrated). The example pruner 410b performs pruning (e.g., block 906 of FIG. 9). For example, the pruner 410b projects the object layer of the basic view 1152 onto the object layers of the additional views 1154 of the $k^{th}$ object to generate an example first mask 1156, an example second mask 1158, an example third mask 1160, and an example fourth mask 1162. For example, the first mask 1156 is a mask of the pruned first pruned view v0 of the $k^{th}$ object, the second mask 1158 is a mask of the pruned second view v1 of the first object, the third mask 1160 is a mask of the pruned third view v2 of the $k^{th}$ object, and the fourth mask 1112 is a mask of the pruned fourth view v3 of the $k^{th}$ object.

Figure 12:
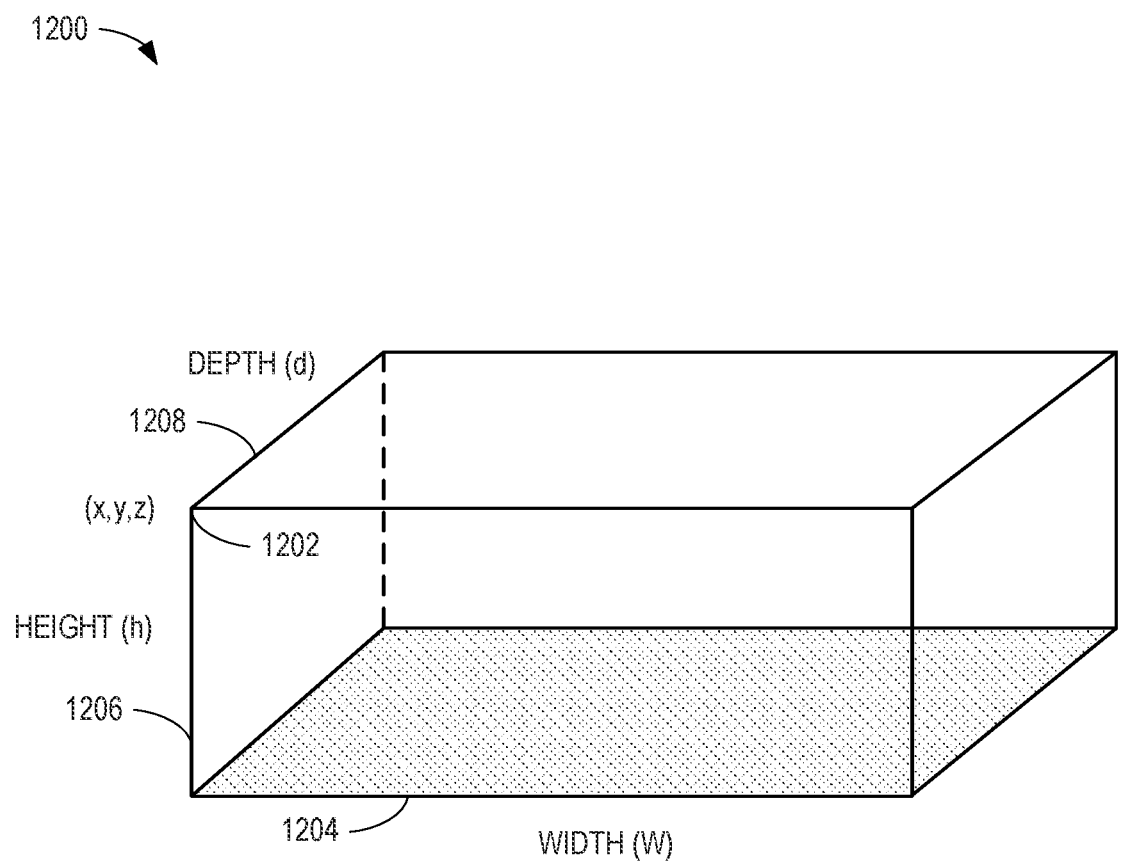
FIG. 12 illustrates an example 3D bounding box.

FIG. 12 illustrates an example 3D bounding box 1200. In examples disclosed herein, the bounding box 1200 is associated with an object (not illustrated). The geometry of the bounding box 1200 is specified by a starting point 1202. For example, the starting point 1202 corresponds to the coordinates (x, y, z). The bounding box 1200 has an example width 1204, an example height 1206, and an example depth 1208. That is, the width 1204, the height 1206, and the depth 1208 are measured with respect to the starting point 1202. In some examples, the width 1204, the height 1206, and the depth 1208 are measured in floating point values.

Figure 13:
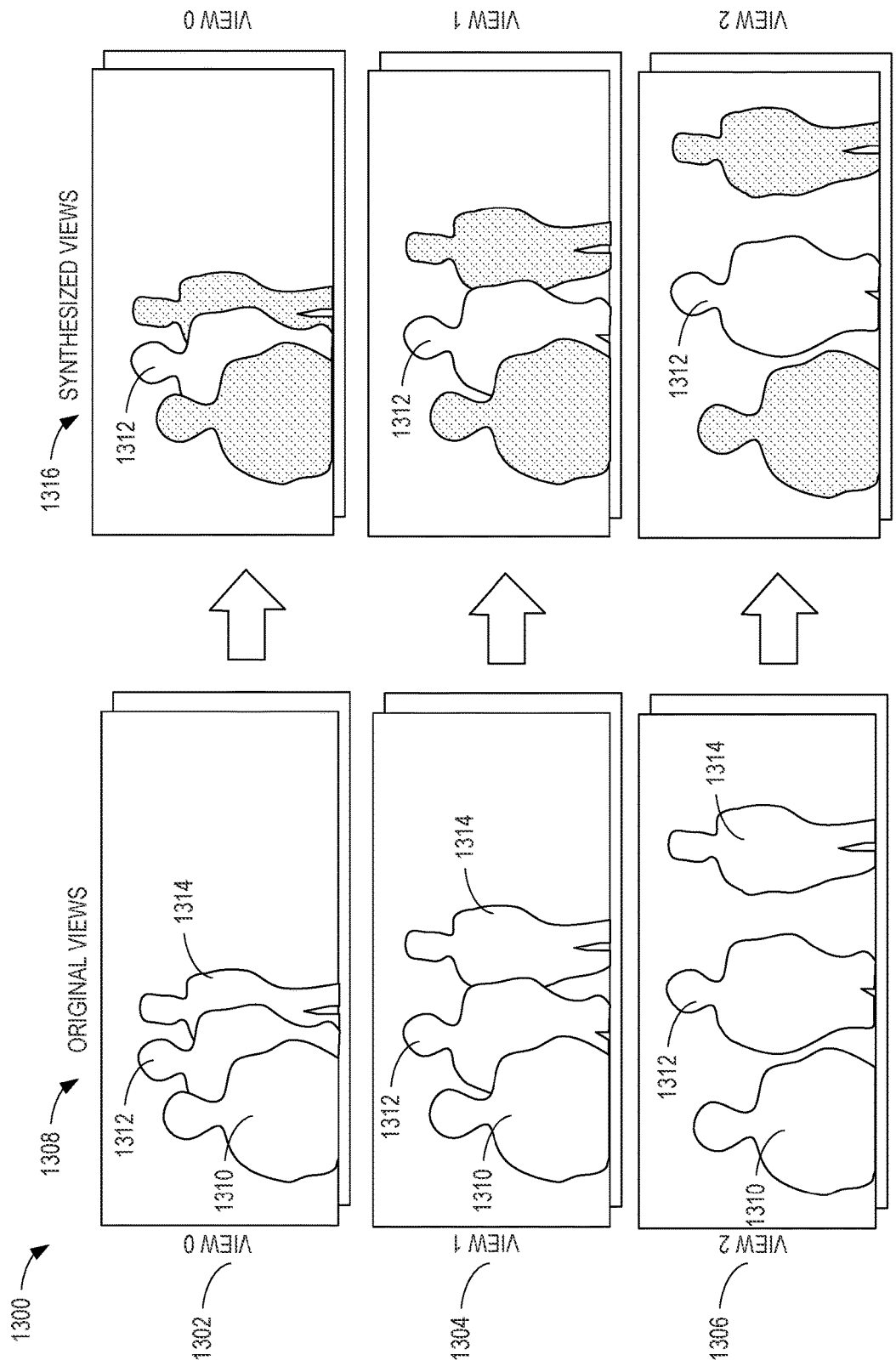
FIG. 13 illustrates an example object-based synthesized scene.

FIG. 13 illustrates an example object-based synthesized scene 1300. For example, the object-based synthesized scene 1300 includes an example first view 1302, an example second view 1304, and an example third view 1306. For example, the views 1302, 1304, 1306 are captured from three different cameras at three different angles relative to each other. The illustrated example of FIG. 13 includes example original views 1308. For example, the original views 1308 are texture maps. The example original views 1308 can additionally or alternatively include depth maps and/or object maps. For example, the views 1302, 1304, 1306 include an example first person 1310, an example second person 1312, and an example third person 1314. That is, the example first person 1310 corresponds to a first object ID, the example second person 1312 corresponds to a second object ID, and the example third person 1314 corresponds to a third object ID.

The example object-based synthesized scene 1300 includes example synthesized views 1316. For example, the example object-based MIV encoder 310 encodes the views 1302, 1304, 1306 and the example video renderer 362 (FIG. 3) generates the synthesized views 1316. In the illustrated example of FIG. 13, the example video renderer 362 filtered out the first person 1310 and the third person 1314. That is, the example synthesized views 1316 include the example second person 1312 and not the example first person 1310 or the example third person 1314.

While an example manner of implementing the server side immersive video encoding system 302 of FIG. 3 is illustrated in FIG. 4, one or more of the elements, processes and/or devices illustrated in FIGS. 3 and/or 4 may be combined, divided, re-arranged, omitted, eliminated and/or implemented in any other way. Further, the example video capturer(s) 304, the example segmenter 305, the example virtual camera renderer 306, the example object and depth information storage 308, the example object-based MIV encoder 310, the example video encoder 312, the example stream packager 314, the example content management system 315, the example content distribution network 316, the example view labeler 402, the example object-based atlas constructor 404, the example depth occupancy coder 424, the example metadata composer 430, the example bitstream encoder 438 and/or, more generally, the server side immersive video encoding system 302 of FIG. 3 may be implemented by hardware, software, firmware and/or any combination of hardware, software and/or firmware. Thus, for example, any of the example video capturer(s) 304, the example segmenter 305, the example virtual camera renderer 306, the example object and depth information storage 308, the example object-based MIV encoder 310, the example video encoder 312, the example stream packager 314, the example content management system 315. the example content distribution network 316, the example view labeler 402, the example object-based atlas constructor 404, the example depth occupancy coder 424, the example metadata composer 430, the example bitstream encoder 438 and/or, more generally, the example server side immersive video encoding system 302 could be implemented by one or more analog or digital circuit(s), logic circuits, programmable processor(s), programmable controller(s), graphics processing units) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example video capturer(s) 304, the example segmenter 305, the example virtual camera renderer 306, the example object and depth information storage 308, the example object-based MIV encoder 310, the example video encoder 312, the example stream packager 314, the example content management system 315, the example content distribution network 316, the example view labeler 402, the example object-based atlas constructor 404, the example depth occupancy coder 424, the example metadata composer 430, and/or the example bitstream encoder 438 is/are hereby expressly defined to include a non-transitory computer readable storage device or storage disk such as a memory, a digital versatile disk (DVD), a compact disk (CD), a Blu-ray disk, etc. including the software and/or firmware. Further still, the example server side immersive video encoding system 302 of FIG. 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the client side immersive video decoding system 350 of FIG. 3 is illustrated in FIG. 5, one or more of the elements, processes and/or devices illustrated in FIGS. 3 and/or 5 may be combined, divided, re-arranged, omitted, eliminated and/or implemented in any other way. Further, the example de-packager 354, the example MIV decoder 356, the example presentation engine 358, the example video decoder 360, the example video renderer 362, the example video decoder 502, the example metadata parser 504, the example atlas patch occupancy map generator 506, the example object filter 522, the example synthesizer 524, the example inpainter 526 and/or, more generally, the example client side immersive video decoding system 350 of FIG. 5 may be implemented by hardware, software, firmware and/or any combination of hardware, software and/or firmware. Thus, for example, any of the example de-packager 354, the example MIV decoder 356, the example presentation engine 358, the example video decoder 360, the example video renderer 362, the example video decoder 502, the example metadata parser 504, the example atlas patch occupancy map generator 506, the example object filter 522, the example synthesizer 524, the example inpainter 526 and/or, more generally, the example client side immersive video decoding system 350 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, de-packager 354, the example MIV decoder 356, the example presentation engine 358, the example video decoder 360, the example video renderer 362, the example video decoder 502, the example metadata parser 504, the example atlas patch occupancy map generator 506, the example object filter 522, the example synthesizer 524, and/or the example inpainter 526 is/are hereby expressly defined to include a non-transitory computer readable storage device or storage disk such as a memory, a digital versatile disk (DVD), a compact disk (CD), a Blu-ray disk, etc. including the software and/or firmware. Further still, the example client side immersive video decoding system 350 of FIG. 3 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
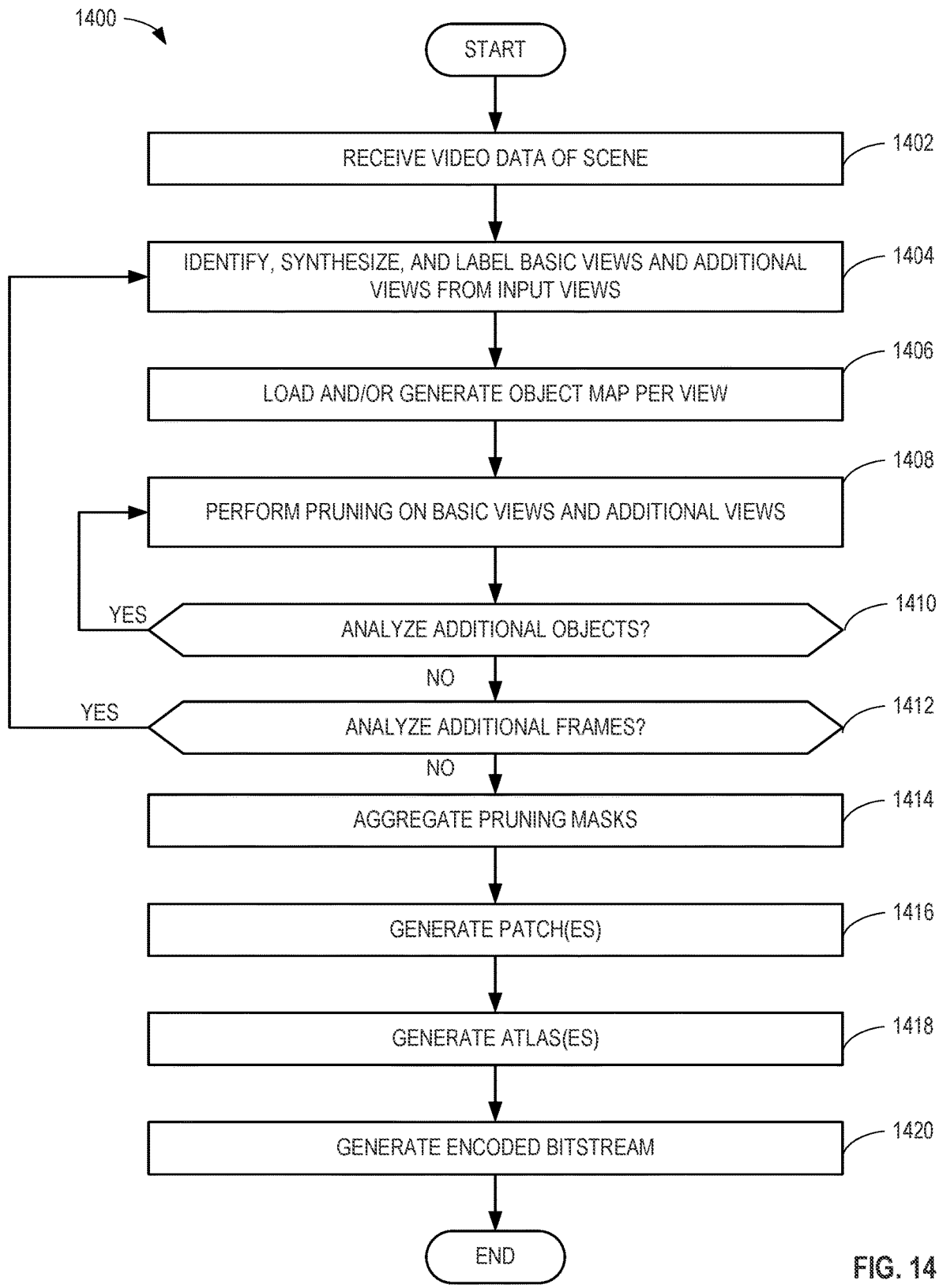
FIG. 14 is a flowchart representative of machine readable instructions which may be executed to implement the object-based MIV encoder of FIGS. 3 and/or 4.

A flowchart representative of example hardware logic, machine readable instructions, hardware implemented state machines, and/or any combination thereof for implementing the example server side immersive video encoding system 302 of FIGS. 3 and/or 4 is shown in FIG. 14. The machine readable instructions may be one or more executable programs or portion(s) of an executable program for execution by a computer processor and/or processor circuitry, such as the processor 1612 shown in the example processor platform 1600 discussed below in connection with FIG. 16. The program may he embodied in software stored on a non-transitory computer readable storage medium such as a CD-ROM, a floppy disk, a hard drive, a DVD, a Blu-ray disk, or a memory associated with the processor 1612, but the entire program and/or parts thereof could alternatively be executed by a device other than the processor 1612 and/or embodied in firmware or dedicated hardware. Further, although the example program is described with reference to the flowchart illustrated in FIG. 14, many other methods of implementing the example server side immersive video encoding system 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 15:
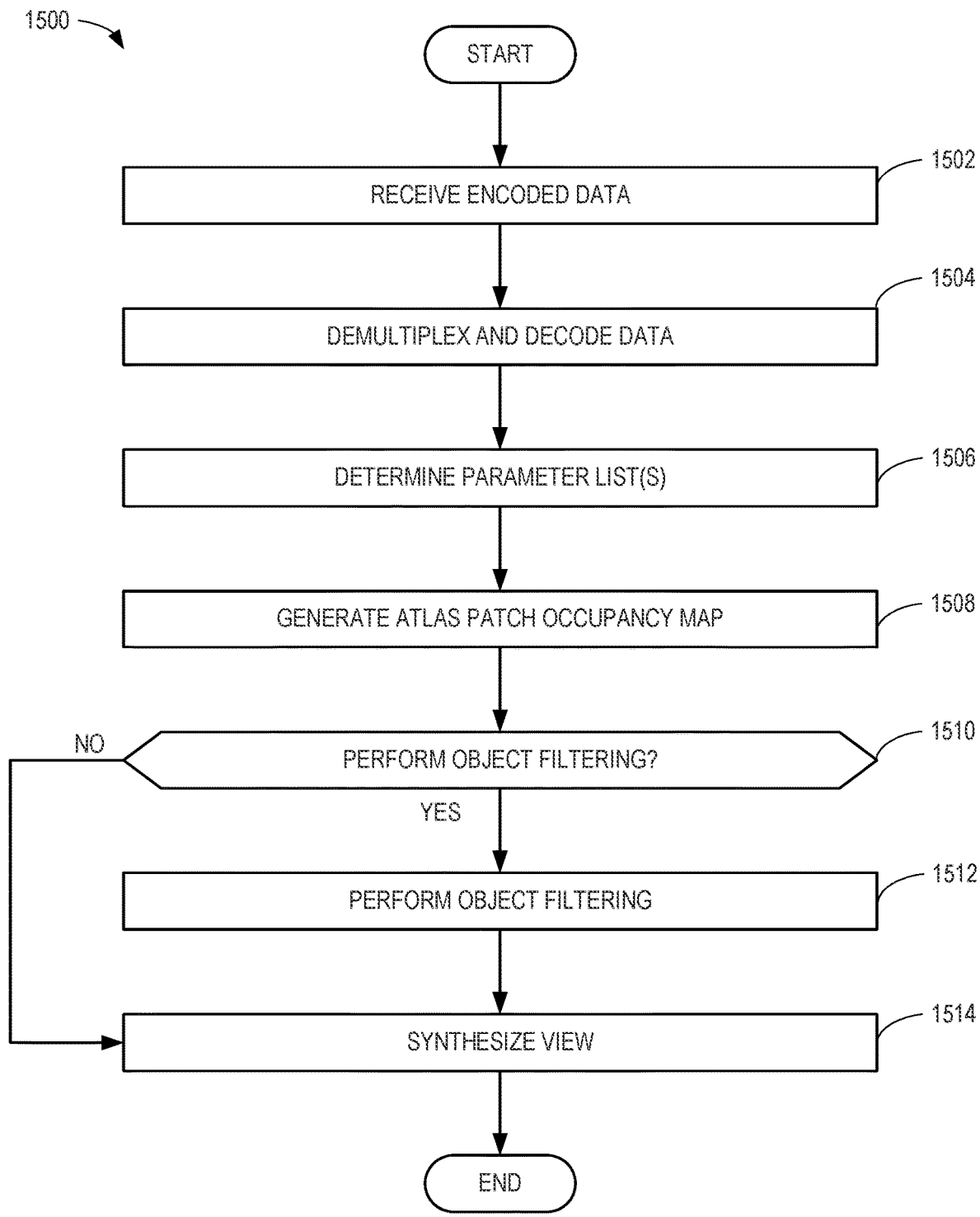
FIG. 15 is a flowchart representative of machine readable instructions which may be executed to implement the example MIV decoder and the example renderer of FIGS. 3 and/or 5.

A flowchart representative of example hardware logic, machine readable instructions, hardware implemented state machines, and/or any combination thereof for implementing the example client side immersive video decoding system 350 of FIGS. 3 and/or 5 is shown in FIG. 15. The machine readable instructions may be one or more executable programs or portion(s) of an executable program for execution by a computer processor and/or processor circuitry, such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIG. 15, many other methods of implementing the example client side immersive video decoding system 350 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 14-15 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program 1400 of FIG. 14 includes block 1402. At block 1402, the example view labeler 402 (FIG. 4) receives video data of a scene. For example, the view labeler 402 receives input views including texture maps, depth maps, and/or object maps. At block 1404, the example view labeler 402 identifies, synthesizes, and labels basic views and additional views from the input views. For example, the view labeler 402 identifies and labels multiple basic and additional views. Additionally or alternatively, the view labeler 402 identifies one basic view, no additional views, etc.

At block 1406, the example object loader 406 (FIG. 4) loads and/or generates an object map per view. For example, the object loader 406 loads the object maps of the image data of the scene. At block 1408, the example pruners 410*a*, 410*b* (FIG. 4) perform pruning on the basic views and the additional views. That is, the example pruners 410*a*, 410*b* generate pruning masks. In some examples, the pruners 410*a*, 410*b* perform object-based pruning. For example, the example object separators 408*a*, 408*b* (FIG. 4) generate object layers based on the object map. The example pruner 410*a* projects the object layers of the basic views onto the object layers of the additional views of object A, the example pruner 410*b* projects the object layers of the basic views onto the object layers of the additional views of an object B, etc. Additionally or alternatively, the example pruners 410*a*, 410*b* perform object-selected pruning. For example, the pruner 410*a* projects the object layer of the basic view onto the object layers of the additional views of object A, the example pruner 410*b* projects the object layer of the basic view onto the object layers of the additional views of object B, etc.

At block 1410, the example pruners 410*a*, 410*b* determine whether to analyze additional objects. For example, the pruners 410*a*, 410*b* determine if all of the object indices of the object maps have been analyzed. If the example pruners 410*a*, 410*b* determine to analyze additional objects, control returns to block 1408. If the example pruners 410*a*, 410*b* determine to not analyze additional objects, at block 1412, the example object-based atlas constructor 404 (FIG. 4) determines whether to analyze additional frames. For example, the object-based atlas constructor 404 determines whether there are remaining frames of the input data in an intra-period. If the example object-based atlas constructor 404 determines to analyze additional frames, control returns to block 1404.

If the example object-based atlas constructor 404 determines to not analyze additional frames, at block 1414, the example 414 (FIG. 4) aggregates pruning masks. For example, the aggregator 414 aggregates the pruning masks of the frames of the intra-period. At block 1416, the example patch packer 418 (FIG. 4) generates patches. For example, the patch packer 418 generates patches based on the aggregated masks. In examples disclosed herein, each patch is associated with a single object. Thus, the example patch packer 418 tags the patch with the corresponding object ID, adds the object ID per patch within an associated atlas patch parameters list, etc.

At block 1418, the example atlas generator 420 generates atlases. For example, the atlas generator 420 packs the patches generated by the patch packer 418 into atlases. At block 1420, the example object-based MIV encoder 310 generates an encoded bitstream. For example, the object-based MIV encoder 310 multiplexes the atlases and parameters to form a V3C sample stream.

The program 1500 of FIG. 15 includes block 1502. At block 1502, the example MIV decoder 356 receives encoded data. For example, the MIV decoder 356 receives the encoded bitstream generated by the example object-based MIV encoder 310 (FIG. 3). At block 1504, the example MIV decoder 356 demultiplexes and decodes the encoded data. For example, the video decoder 502 (FIG. 5) decodes the encoded atlases to produce decoded atlases including texture and depth data (e.g., the atlases 514 of FIG. 5).

At block 1506, the example metadata parser 504 determiners parameter lists. For example, the metadata parser 504 parses the encoded data to determine example IV access unit parameters 516 (FIG. 5) and example IV sequence parameters 518 (FIG. 5). At block 1508, the example atlas patch occupancy map generator 506 (FIG. 5) generates an atlas patch occupancy map. For example, the atlas patch occupancy map generator 506 generates the example occupancy map 520 (FIG. 5).

At block 1510, the example object filter 522 (FIG. 5) determines whether to perform object filtering. For example, the object filter 522 determines whether to filter out objects. In some examples, the object filter 522 receives user input and/or user preference (e.g., filter out one sports team, filter out background, etc.). If the example object filter 522 determines to perform object filtering, at block 1512, the example object filter 522 performs object filtering. For example, the object filter 522 sets pixels corresponding to the object ID of filtered objects of the atlases to unoccupied, removes patches corresponding to the object ID of the filtered objects from the atlases, etc.

Returning to block 1510, if the example object filter 522 determines to not perform object filtering, at block 1514, the example video renderer 362 (FIG. 3) synthesizes a view. For example, the synthesizer 524 (FIG. 4) synthesizes a scene based on the atlases, the occupancy map, and/or the parameters.

Figure 16:
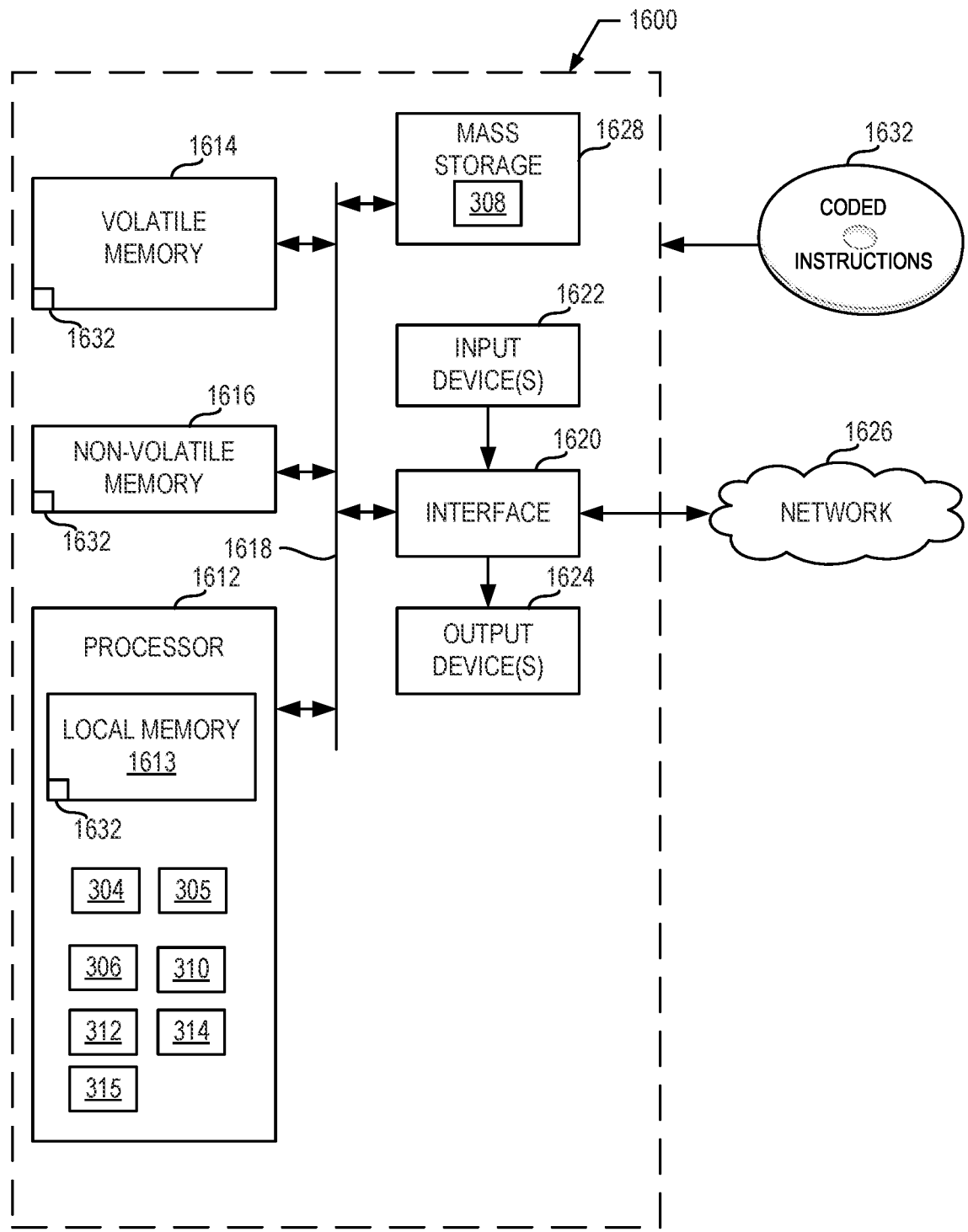
FIG. 16 is a block diagram of an example processing platform structured to execute the instructions of FIG. 14 to implement the object-based MIV encoder of FIGS. 3 and/or 4.

FIG. 16 is a block diagram of an example processor platform 1600 structured to execute the instructions of FIG. 14 to implement the server side immersive video encoding system 302 of FIGS. 3 and/or 4. The processor platform 1600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example video capturer(s) 304, the example segmenter 305, the example virtual camera. renderer 306, the example object-based MIV encoder 310, the example video encoder 312. The example stream packager 314, and the example content management system 315.

The processor 1612 of the illustrated example includes a local memory 1613 (e.g., a cache). The processor 1612 of the illustrated example is in communication with a main memory including a volatile memory 1614 and anon-volatile memory 1616 via a bus 1618. The volatile memory 1614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a universal serial bus (USB), a Bluetooth® interface, a near field communication (NFC) interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, redundant array of independent disks (RAID) systems, and digital versatile disk (DVD) drives.

The machine executable instructions 1632 of FIG. 14 may be stored in the mass storage device 1628, in the volatile memory 1614, in the non-volatile memory 1616, and/or on a removable non-transitory computer readable storage medium such as a CD or DVD.

Figure 17:
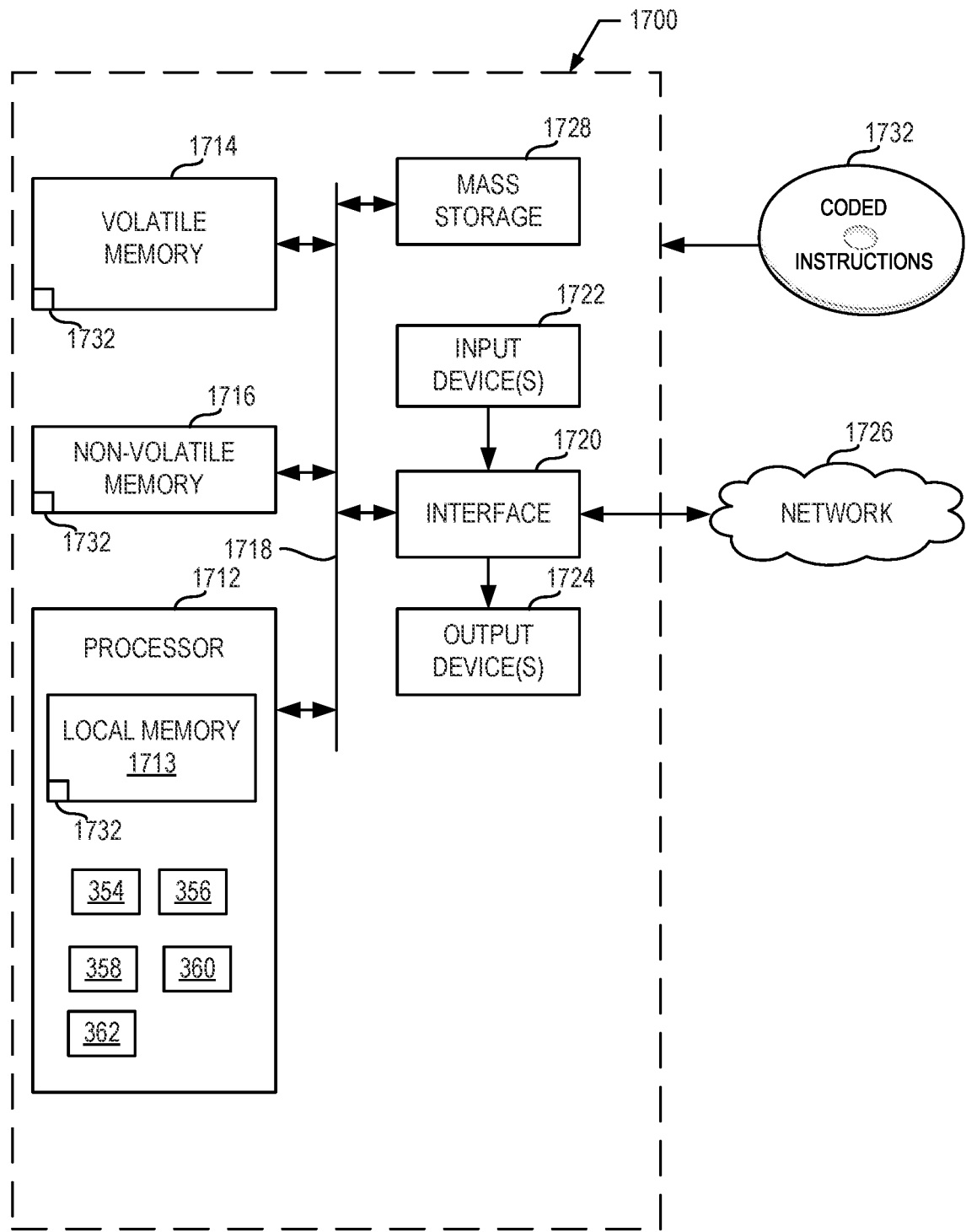
FIG. 17 is a block diagram of an example processing platform structured to execute the instructions of FIG. 15 to implement the example MIV decoder and the example renderer of FIGS. 3 and/or 5.

FIG. 17 is a block diagram of an example processor platform 1700 structured to execute the instructions of FIG. 15 to implement the client side immersive video decoding system 350 of FIGS. 3 and/or 5. The processor platform 1700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example de-packager 354, the example MIV decoder 356, the example presentation engine 358, the example video decoder 360, and the example video renderer 362.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), a Bluetooth® interface, a near field communication (NEC) interface, and/or a PCI express interface.

In the illustrated example, one or more input devices 1722 are connected to the interface circuit 1720. The input device(s) 1722 permit(s) a user to enter data and/or commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIG. 15 may be stored in the mass storage device 1728, in the volatile memory 1714, in the non-volatile memory 1716, and/or on a removable non-transitory computer readable storage medium such as a CD or DVD.

Figure 18:
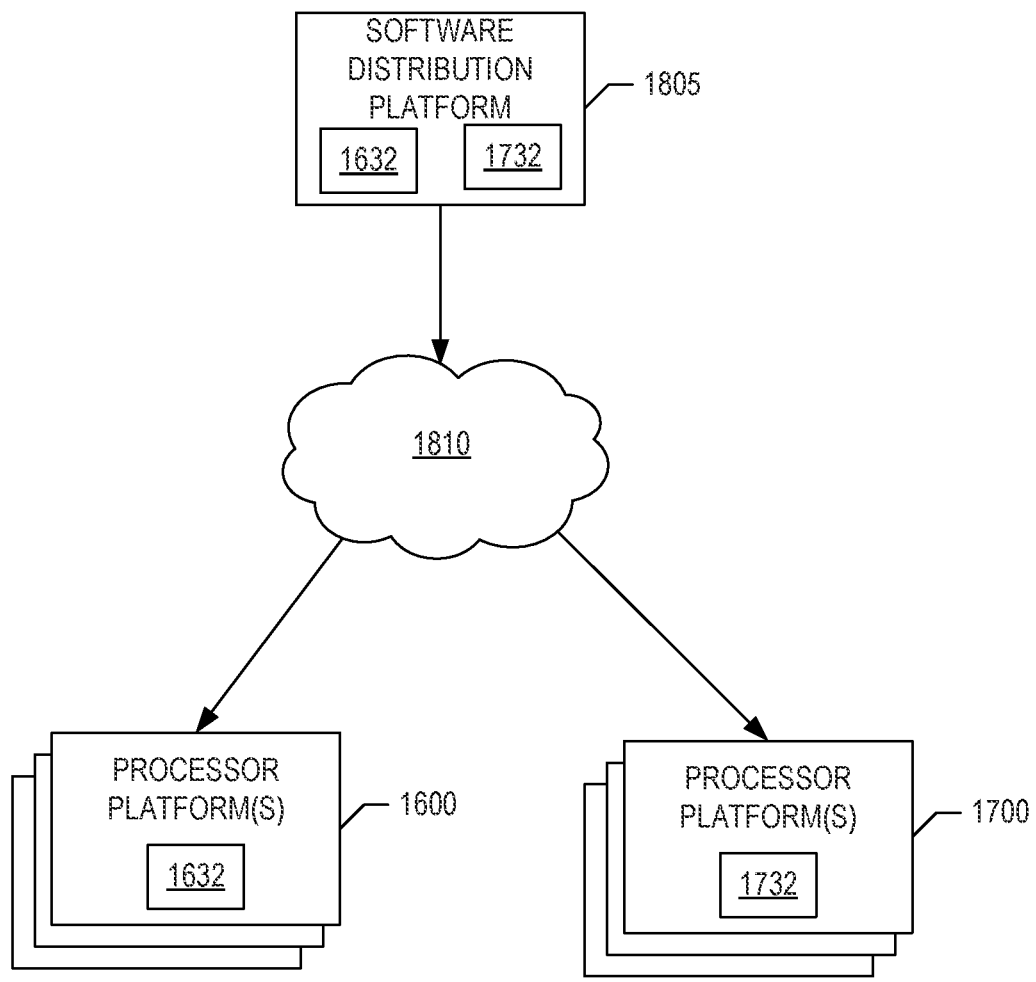
FIG. 18 is a block diagram of an example software distribution platform to distribute software (e.g., software corresponding to the example computer readable instructions of FIGS. 14-15) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1805 to distribute software such as the example computer readable instructions 1632 of FIG. 16 and/or the example computer readable instructions 1732 of FIG. 17 to third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1632 of FIG. 16 and/or the example computer readable instructions 1732 of FIG. 17. The third parties may be consumers, users, retailers, OEMs, etc., who purchase and/or license the software for use and/or re-sale and/or sub-licensing. In the illustrated. example, the software distribution platform 1805 includes one or more servers and one or more storage devices. The storage devices store the computer readable instructions 1632 and/or 1732. which may correspond to the example computer readable instructions 1632 of FIG. 16 and/or the example computer readable instructions 1732 of FIG. 17, as described above. The one or more servers of the example software distribution platform 1805 are in communication with a network 1810, which may correspond to any one or more of the Internet and/or any of the example networks 1626, 1726 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1632 and/or 1732 from the software distribution platform 1805. For example, the software, which may correspond to the example computer readable instructions 1632 of FIG. 16, may be downloaded to the example processor platform 1600, which is to execute the computer readable instructions 1632 to implement the server side immersive video encoding system 302. For example, the software, which may correspond to the example computer readable instructions 1732 of FIG. 17, may be downloaded to the example processor platform 1700, which is to execute the computer readable instructions 1732 to implement the client side immersive video decoding system 350. In some example, one or more servers of the software distribution platform 1805 periodically offer, transmit, and/or force updates to the software (e.g., the example computer readable instructions 1632 of FIG. 16 and/or the example computer readable instructions 1732 of FIG. 17) to ensure improvements, patches, updates, etc. are distributed and applied to the software at the end user devices.

From the foregoing, it will be appreciated that example methods, apparatus and articles of manufacture have been disclosed that enable object-based immersive video coding. The disclosed methods, apparatus and articles of manufacture improve the efficiency of using a computing device by assigning object IDs. For example, an object-based encoder varies the number of bits used to store object IDs based on the total number of objects in a scene. The object-based encoder identifies objects of interest and allocates relatively more bandwidth to encode the objects of interest and relatively less bandwidth to background objects, static objects, etc. The disclosed methods, apparatus and articles of manufacture are accordingly directed to one or more improvement(s) in the functioning of a computer.

Example methods, apparatus, systems, and articles of manufacture for immersive video coding using object metadata are disclosed herein. Further examples and combinations thereof include the following:

Example 1 includes a video encoder comprising an object separator to separate input views into layers associated with respective objects to generate object layers for geometry data and texture data of the input views, a first object layer associated with a first object, the input views including at least one basic view and at least one additional view, a pruner to project the first object layer of a first basic view of the at least one basic views against the first object layer of a first additional view of the at least one additional views to generate a first pruned view and a first pruning mask, a patch packer to tag a patch with an object identifier of the first object, the patch corresponding to the first pruning mask, and an atlas generator to generate at least one atlas to include in encoded video data, the atlas including the patch.

Example 2 includes the video encoder of example 1, wherein the pruner is to project the first object layer of the first basic view and the first object layer of the first pruned view against the first object layer of a second additional view of the at least one additional view to generate a second pruning mask.

Example 3 includes the video encoder of example 2, further including an aggregator to aggregate the first pruning mask and the second pruning mask.

Example 4 includes the video encoder of example 3, further including a clusterer to cluster pixels of the first pruning mask and the second pruning mask to generate the patch.

Example 5 includes the video encoder of example 1, wherein the patch packer is to identify a location of the patch in the at least one atlas, and generate metadata corresponding to the patch.

Example 6 includes the video encoder of example 5, wherein the at least one atlas includes at least one of texture maps, depth maps, or occupancy maps.

Example 7 includes the video encoder of example 1, wherein the input views include texture maps, depth maps, and object maps.

Example 8 includes the video encoder of example 7, further including a segmenter to generate object maps, wherein data locations of the object maps store object identifiers identifying objects represented in the texture maps and the depth maps.

Example 9 includes the video encoder of example 7, wherein the object separator is to generate the object layers based on the object maps, the object layers corresponding to object identifiers and the object maps including the object identifiers.

Example 10 includes the video encoder of example 1, wherein the input views include a first view corresponding to a first object map, the first view includes the first object, and the object identifier of the first object is stored in the first object map.

Example 11 includes the video encoder of example 10, wherein the input views include a second view corresponding to a second object map, the second view includes the first object, and the object identifier of the first object is stored in the second object map.

Example 12 includes the video encoder of example 1, further including a view labeler to select, from the input views, a view including the first object based on at least one criteria, the at least one criteria including at least one of pixel count of object maps, depth range of depth data, or a number of features of texture data.

Example 13 includes the video encoder of example 12, wherein the pruner is to project the first object layer of the selected view onto the object layers of the additional views to generate pruning masks associated with the first object.

Example 14 includes the video encoder of example 1, wherein the first object is associated with a bounding box, the bounding box having a depth, a height, and a width.

Example 15 includes the video encoder of example 1, wherein the first object is static, and the pruner is to update the patch once per intra-period, an intra-period including a plurality of frames.

Example 16 includes the video encoder of example 15, wherein the input views includes a second object, the object separator is to generate a second object layer associated with the second object and further including a clusterer to generate a second patch of the second object once per frame.

Example 17 includes the video encoder of example 16, wherein the input views include a third object, the object separator is to generate a third object layer associated with the third object and the clusterer is to generate a third patch of the third object at a lower resolution than the second patch.

Example 18 includes the video encoder of example 1, wherein the object identifier is stored in a supplemental enhancement information (SET) message.

Example 19 includes a non-transitory computer readable medium comprising instructions which, when executed, cause a machine to at least separate input views into layers associated with respective objects to generate object layers for geometry data and texture data of the input views, a first object layer associated with a first object, the input views including at least one basic view and at least one additional view, project the first object layer of a first basic view of the at least one basic views against the first object layer of a first additional view of the at least one additional views to generate a first pruned view and a first pruning mask, tag a patch with an object identifier of the first object, the patch corresponding to the first pruning mask, and generate at least one atlas to include in encoded video data, the atlas including the patch.

Example 20 includes the non-transitory computer readable medium of example 19, wherein the instructions cause the machine to project the first object layer of the first basic view and the first object layer of the first pruned view against the first object layer of a second additional view of the at least one additional view to generate a second pruning mask.

Example 21 includes the non-transitory computer readable medium of example 20, wherein the instructions cause the machine to aggregate the first pruning mask and the second pruning mask.

Example 22 includes the non-transitory computer readable medium of example 21, wherein the instructions cause the machine to cluster pixels of the first pruning mask and the second pruning mask to generate the patch.

Example 23 includes the non-transitory computer readable medium of example 19, wherein the instructions cause the machine to identify a location of the patch in the at least one atlas, and generate metadata corresponding to the patch.

Example 24 includes the non-transitory computer readable medium of example 23, wherein the at least one atlas includes at least one of texture maps, depth maps, or occupancy maps.

Example 25 includes the non-transitory computer readable medium of example 19, wherein the input views include texture maps, depth maps, and object maps.

Example 26 includes the non-transitory computer readable medium of example 25, wherein the instructions cause the machine to generate object maps, wherein data locations of the object maps store object identifiers identifying objects represented in the texture maps and the depth maps.

Example 27 includes the non-transitory computer readable medium of example 25, wherein the instructions cause the machine to generate the object layers based on the object maps, the object layers corresponding to object identifiers and the object maps including the object identifiers.

Example 28 includes the non-transitory computer readable medium of example 19, wherein the input views include a first view corresponding to a first object map, the first view includes the first object, and the object identifier of the first object is stored in the first object map.

Example 29 includes the non-transitory computer readable medium of example 28, wherein the input views include a second view corresponding to a second object map, the second view includes the first object, and the object identifier of the first object is stored in the second object map.

Example 30 includes the non-transitory computer readable medium of example 19, wherein the instructions cause the machine to select, from the input views, a view including the first object based on at least one criteria, the at least one criteria including at least one of pixel count of object maps, depth range of depth data, or a number of features of texture data.

Example 31 includes the non-transitory computer readable medium of example 30, wherein the instructions cause the machine to project the first object layer of the selected view onto the object layers of the additional views to generate pruning masks associated with the first object.

Example 32 includes the non-transitory computer readable medium of example 19, wherein the first object is associated with a bounding box, the bounding box having a depth, a height, and a width.

Example 33 includes the non-transitory computer readable medium of example 19, wherein the first object is static, and the instructions cause the machine to update the patch once per intra-period, an intra-period including a plurality of frames.

Example 34 includes the non-transitory computer readable medium of example 33, wherein the input views includes a second object, the instructions cause the machine to generate a second object layer associated with the second object and generate a second patch of the second object once per frame.

Example 35 includes the non-transitory computer readable medium of example 34, wherein the input views include a third object, the instructions cause the machine to generate a third object layer associated with the third object and generate a third patch of the third object at a lower resolution than the second patch.

Example 36 includes the non-transitory computer readable medium of example 19, wherein the object identifier is stored in a supplemental enhancement information (SEI) message.

Example 37 includes a method comprising separating input views into layers associated with respective objects to generate object layers for geometry data and texture data of the input views, a first object layer associated with a first object, the input views including at least one basic view and at least one additional view, projecting the first object layer of a first basic view of the at least one basic views against the first object layer of a first additional view of the at least one additional views to generate a first pruned view and a first pruning mask, tagging a patch with an object identifier of the first object, the patch corresponding to the first pruning mask, and generating at least one atlas to include in encoded video data, the atlas including the patch.

Example 38 includes the method of example 37, further including projecting the first object layer of the first basic view and the first object layer of the first pruned view against the first object layer of a second additional view of the at least one additional view to generate a second pruning mask.

Example 39 includes the method of example 38, further including aggregating the first pruning mask and the second pruning mask.

Example 40 includes the method of example 39, further including clustering pixels of the first pruning mask and the second pruning mask to generate the patch.

Example 41 includes the method of example 37. further including identifying a location of the patch in the at least one atlas, and generating metadata corresponding to the patch.

Example 42 includes the method of example 41, wherein the at least one atlas includes at least one of texture maps, depth maps, or occupancy maps.

Example 43 includes the method of example 37, wherein the input views include texture maps, depth maps, and object maps.

Example 44 includes the method of example 43, further including generating object maps, wherein data locations of the object maps store object identifiers identifying objects represented in the texture maps and the depth maps.

Example 45 includes the method of example 43, further including generating the object layers based on the object maps, the object layers corresponding to object identifiers and the object maps including the object identifiers.

Example 46 includes the method of example 37, wherein the input views include a first view corresponding to a first object map, the first view include the first object, and the object identifier of the first object is stored in the first object map.

Example 47 includes the method of example 46, wherein the input views include a second view corresponding to a second object map, the second view includes the first object, and the object identifier of the first object is stored in the second object map.

Example 48 includes the method of example 37, further including selecting, from the input views, a view including the first object based on at least one criteria, the at least one criteria including at least one of pixel count of object maps, depth range of depth data, or a number of features of texture data.

Example 49 includes the method of example 48, further including projecting the first object layer of the selected view onto the object layers of the additional views to generate pruning masks associated with the first object.

Example 50 includes the method of example 37, wherein the first object is associated with a bounding box, the bounding box having a depth, a height, and a width.

Example 51 includes the method of example 37, wherein the first object is static, and further including updating the patch once per intra-period, an intra-period including a plurality of frames.

Example 52 includes the method of example 51, wherein the input views includes a second object, further including generating a second object layer associated with the second object and generating a second patch of the second object once per frame.

Example 53 includes the method of example 52, wherein the input views include a third object, further including generating a third object layer associated with the third object and generating a third patch of the third object at a lower resolution than the second patch.

Example 54 includes the method of example 37, wherein the object identifier is stored in a supplemental enhancement information (SEI) message.

Example 55 includes a video decoder, comprising a bitstream decoder to decode encoded video data to obtain a decoded atlas and metadata, the decoded atlas including patches tagged with an object identifier, the metadata including a map that maps blocks to patches, an object filter to remove a first patch associated with a first object identifier from the map to generate a modified map, and a renderer to map a second patch associated with a second object identifier from the decoded atlas based on the modified map, and render the second patch to synthesize a target view.

Example 56 includes the video decoder of example 55, wherein the first patch associated with the first object identifier corresponds to a first object and the second patch associated with the second object identifier corresponds to a second object.

Example 57 includes the video decoder of example 55, wherein the decoded video data includes a bounding box associated with the second object identifier.

Example 58 includes the video decoder of example 57, wherein the renderer is to identify the bounding box to generate a viewport video that tracks movement of a second object based on the bounding box.

Example 59 includes the video decoder of example 57, wherein the renderer is to render a third patch associated with a third object identifier to synthesize the target view, and blur the first patch associated with the first object identifier and the third patch associated with the third object identifier, the third object identifier corresponding to a background object of the target view.

Example 60 includes the video decoder of example 59, wherein the renderer is to render the third patch associated with the third object identifier at a lower resolution than the second patch associated with the second object identifier.

Example 61 includes the video decoder of example 59, wherein the renderer is to replace the third patch associated with the third object identifier with a synthesized object.

Example 62 includes a non-transitory computer readable medium comprising instructions which, when executed, cause a machine to at least decode encoded video data to obtain a decoded atlas and metadata, the decoded atlas including patches tagged with an object identifier, the metadata including a map that maps blocks to patches, remove a first patch associated with a first object identifier from the map to generate a modified map, map a second patch associated with a second object identifier from the decoded atlas based on the modified map, and render the second patch to synthesize a target view.

Example 63 includes the non-transitory computer readable medium of example 62, wherein the first patch associated with the first object identifier corresponds to a first object and the second patch associated with the second object identifier corresponds to a second object.

Example 64 includes the non-transitory computer readable medium of example 62, wherein the decoded video data includes a bounding box associated with the second object identifier.

Example 65 includes the non-transitory computer readable medium of example 64, wherein the instructions cause the machine to identify the bounding box to generate a viewport video that tracks movement of a second object based on the bounding box.

Example 66 includes the non-transitory computer readable medium of example 64, wherein the instructions cause the machine to render a third patch associated with a third object identifier to synthesize the target view, and blur the first patch associated with the first object identifier and the third patch associated with the third object identifier, the third object identifier corresponding to a background object of the target view.

Example 67 includes the non-transitory computer readable medium of example 66, wherein the instructions cause the machine to render the third patch associated with the third object identifier at a lower resolution than the second patch associated with the second object identifier.

Example 68 includes the non-transitory computer readable medium of example 66, wherein instructions cause the machine to replace the third patch associated with the third object identifier with a synthesized object.

Example 69 includes a method comprising decoding encoded video data to obtain a decoded atlas and metadata, the decoded atlas including patches tagged with an object identifier, the metadata including a map that maps blocks to patches, removing a first patch associated with a first object identifier from the map to generate a modified map, mapping a second patch associated with a second object identifier from the decoded atlas based on the modified map, and rendering the second patch to synthesize a target view.

Example 70 includes the method of example 69, wherein the first patch associated with the first object identifier corresponds to a first object and the second patch associated with the second object identifier corresponds to a second object.

Example 71 includes the method of example 69, wherein the decoded video data includes a bounding box associated with the second object identifier.

Example 72 includes the method of example 71, further including identifying the bounding box to generate a viewport video that tracks movement of a second object based on the bounding box.

Example 73 includes the method of example 71, further including rendering a third patch associated with a third object identifier to synthesize the target view, and blurring the first patch associated with the first object identifier and the third patch associated with the third object identifier, the third object identifier corresponding to a background object of the target view.

Example 74 includes the method of example 73, further including rendering the third patch associated with the third object identifier at a lower resolution than the second patch associated with the second object identifier.

Example 75 includes the method of example 73, further including replacing the third patch associated with the third object identifier with a synthesized object.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A video encoder comprising:
at least one memory;
instructions; and
processor circuitry to execute the instructions to:
separate input views into layers associated with respective objects to generate object layers for geometry data and texture data of the input views, a first object layer associated with a first object, the input views including at least one basic view and at least one additional view;
project the first object layer of a first basic view of the at least one basic views against the first object layer of a first additional view of the at least one additional views to generate a first pruned view and a first pruning mask;
tag a patch with an object identifier of the first object, the patch corresponding to the first pruning mask; and
generate at least one atlas to include in encoded video data, the at least one atlas including the patch.

2. The video encoder of claim 1, wherein the pruner is processor circuitry is to execute the instructions to project the first object layer of the first basic view and the first object layer of the first pruned view against the first object layer of a second additional view of the at least one additional view to generate a second pruning mask.

3. The video encoder of claim 2, wherein the processor circuitry is to aggregate the first pruning mask and the second pruning mask.

4. The video encoder of claim 3, wherein the processor circuitry is to cluster pixels of the first pruning mask and the second pruning mask to generate the patch.

5. The video encoder of claim 1, wherein the processor circuitry is to:
identify a location of the patch in the at least one atlas; and
generate metadata corresponding to the patch.

6. The video encoder of claim 5, wherein the at least one atlas includes at least one of texture maps, depth maps, or occupancy maps.

7. The video encoder of claim 1, wherein the input views include texture maps, depth maps, and object maps.

8. A non-transitory computer readable medium comprising instructions which, when executed, cause processor circuitry to at least:
separate input views into layers associated with respective objects to generate object layers for geometry data and texture data of the input views, a first object layer associated with a first object, the input views including at least one basic view and at least one additional view;
project the first object layer of a first basic view of the at least one basic views against the first object layer of a first additional view of the at least one additional views to generate a first pruned view and a first pruning mask;
tag a patch with an object identifier of the first object, the patch corresponding to the first pruning mask; and
generate at least one atlas to include in encoded video data, the at least one atlas including the patch.

9. The non-transitory computer readable medium of claim 8, wherein the instructions cause the processor circuitry to project the first object layer of the first basic view and the first object layer of the first pruned view against the first object layer of a second additional view of the at least one additional view to generate a second pruning mask.

10. The non-transitory computer readable medium of claim 9, wherein the instructions cause the processor circuitry to aggregate the first pruning mask and the second pruning mask.

11. The non-transitory computer readable medium of claim 10, wherein the instructions cause the processor circuitry to cluster pixels of the first pruning mask and the second pruning mask to generate the patch.

12. The non-transitory computer readable medium of claim 8, wherein the instructions cause the processor circuitry to:
identify a location of the patch in the at least one atlas; and
generate metadata corresponding to the patch.

13. The non-transitory computer readable medium of claim 12, wherein the at least one atlas includes at least one of texture maps, depth maps, or occupancy maps.

14. The non-transitory computer readable medium of claim 8, wherein the input views include texture maps, depth maps, and object maps.

15. A video decoder, comprising:
at least one memory;
instructions; and
processor circuitry to execute the instructions to:
decode encoded video data to obtain a decoded atlas and metadata, the decoded atlas including patches tagged with an object identifier, the metadata including a map that maps blocks to patches;
remove a first patch associated with a first object identifier from the map to generate a modified map;
map a second patch associated with a second object identifier from the decoded atlas based on the modified map; and
render the second patch to synthesize a target view.

16. The video decoder of claim 15, wherein the first patch associated with the first object identifier corresponds to a first object and the second patch associated with the second object identifier corresponds to a second object.

17. The video decoder of claim 15, wherein the decoded video data includes a bounding box associated with the second object identifier.

18. The video decoder of claim 17, wherein the processor circuitry is to identify the bounding box to generate a viewport video that tracks movement of a second object based on the bounding box.

19. The video decoder of claim 17, wherein the processor circuitry is to:
render a third patch associated with a third object identifier to synthesize the target view; and
blur the first patch associated with the first object identifier and the third patch associated with the third object identifier, the third object identifier corresponding to a background object of the target view.

20. The video decoder of claim 19, wherein the processor circuitry is to render the third patch associated with the third object identifier at a lower resolution than the second patch associated with the second object identifier.

* * * * *